(12) United States Patent
McCarthy, III

(10) Patent No.: US 10,219,037 B2
(45) Date of Patent: Feb. 26, 2019

(54) VIDEO OUTPUT BASED ON USER AND LOCATION MONITORING

(71) Applicant: DISH Technologies L.L.C., Englewood, CO (US)

(72) Inventor: Bernard A. McCarthy, III, Atlanta, GA (US)

(73) Assignee: DISH Technologies L.L.C., Englewood, CO (US)

(*) Notice: Subject to any disclaimer, the term of this patent is extended or adjusted under 35 U.S.C. 154(b) by 0 days.

(21) Appl. No.: 15/255,873

(22) Filed: Sep. 2, 2016

(65) Prior Publication Data
US 2018/0070136 A1    Mar. 8, 2018

(51) Int. Cl.
| | | |
|---|---|---|
| H04N 7/173 | (2011.01) |
| H04N 21/45 | (2011.01) |
| H04W 64/00 | (2009.01) |
| H04N 21/44 | (2011.01) |
| H04N 21/442 | (2011.01) |
| H04N 21/4415 | (2011.01) |
| H04N 21/472 | (2011.01) |
| H04N 21/431 | (2011.01) |
| H04N 21/439 | (2011.01) |

(Continued)

(52) U.S. Cl.
CPC ..... *H04N 21/4524* (2013.01); *H04L 65/4076* (2013.01); *H04N 21/42201* (2013.01); *H04N 21/4312* (2013.01); *H04N 21/4394* (2013.01); *H04N 21/44008* (2013.01); *H04N 21/4415* (2013.01); *H04N 21/44213* (2013.01); *H04N 21/472* (2013.01); *H04W 64/006* (2013.01); *H04L 12/2803* (2013.01); *H04L 67/02* (2013.01); *H04W 84/042* (2013.01); *H04W 84/12* (2013.01); *H04W 88/02* (2013.01)

(58) Field of Classification Search
CPC ....... H04N 21/214524; H04N 21/4312; H04N 21/4394; H04N 21/440008; H04N 21/4415
USPC ....................................................... 725/131
See application file for complete search history.

(56) References Cited

U.S. PATENT DOCUMENTS

2013/0040271 A1* 2/2013 Rytky ................ G09B 19/0038
434/247
2014/0379273 A1* 12/2014 Petisce .................. G06F 19/345
702/19

(Continued)

*Primary Examiner* — Jivka A Rabovianski
(74) *Attorney, Agent, or Firm* — Kilpatrick Townsend & Stockton LLP

(57) ABSTRACT

Techniques described herein relate to providing and controlling the output of physical conditioning video resources based on user and location monitoring data. In various embodiments, a receiver may receive physical conditioning videos from one or more video content providers. After receiving the physical conditioning videos, the receiver may analyze and determine various characteristics of the videos, and corresponding user-specific criteria or video interruption conditions that may be applied when a user plays and interacts with the videos. Then, in response to a user request to commence a physical conditioning video, the receiver may analyze personal user monitoring data and/or location monitoring data, and may use the monitoring data to determine the user's current readiness level to complete the physical conditioning video. The receiver then may control the output of the physical conditioning videos based on the user's current readiness level, along with various other user data.

19 Claims, 11 Drawing Sheets

(51) Int. Cl.
  *H04L 29/06* (2006.01)
  *H04N 21/422* (2011.01)
  *H04W 88/02* (2009.01)
  *H04L 29/08* (2006.01)
  *H04W 84/12* (2009.01)
  *H04W 84/04* (2009.01)
  *H04L 12/28* (2006.01)

(56) References Cited

U.S. PATENT DOCUMENTS

2015/0081443 A1* 3/2015 Davis ................ G06Q 30/0251
  705/14.58
2015/0178511 A1* 6/2015 Klappert ............ G06F 21/6245
  726/27
2016/0328577 A1* 11/2016 Howley ................ G06F 19/322

* cited by examiner

US 10,219,037 B2

VIDEO OUTPUT BASED ON USER AND LOCATION MONITORING

BACKGROUND

The present disclosure relates to providing and controlling the output of video resources. Television and other video content may be transmitted to receiver devices (and/or other subscriber equipment) via a number of different video transmission networks. For example, a typical satellite television arrangement comprises a service provider transmitting content via an antenna over a unidirectional satellite communication path to a satellite dish and satellite television receiver on or near a customer's home. Cable television systems, in contrast, may use a specialized wired infrastructure for delivering television content to television receivers and other subscriber devices. Both satellite and cable television services allow for delivery of a large volume of content (e.g., television channels, on-demand content) to subscribers' locations via their respective delivery networks. IP-based video delivery systems may use an infrastructure of computer networks and network devices, software, and data transmission protocols, to transfer streaming video and/or video files. In many cases, the video resources transmitted by content providers may be encoded or encrypted to prevent access by unauthorized persons or devices. Television receivers and/or other subscriber equipment may be programmed to enforce subscription policies by decoding and/or outputting only those channels for which the subscriber device is authorized to receive.

SUMMARY

Aspects described herein provide various techniques for providing and controlling the output of physical conditioning video resources based on user and location monitoring data. In various embodiments, television and/or video receiver devices may receive physical conditioning videos from one or more video content providers. For instance, a user may receive a number of exercise videos from a satellite or cable television provider, as part of an exercise video subscription program. As another example, a user may receive a number of videos from a medical provider (e.g., via an IP network) for assisting with physical therapy (e.g., for elderly or disabled users) or for rehabilitation following an injury. After receiving the physical conditioning videos, the receiver may analyze and/or determine various characteristics of the videos, and corresponding user-specific criteria or video interruption conditions that may be applied when a user plays and interacts with the videos. Then, in response to a user request to commence a physical conditioning video, the receiver may analyze personal user monitoring data and/or location monitoring data, and may use the monitoring data to determine the user's current readiness level to complete the physical conditioning video. For instance, the receiver may compare the current user and location monitoring data to one or more user-specific criteria used to determine whether or not the user may perform an exercise session with a requested video. Finally, the receiver may control the output of the physical conditioning videos based on the user's current readiness level, along with various other user data.

Additional aspects described herein relate to different techniques for controlling the output physical conditioning videos based on user-specific criteria and user-specific video interrupt conditions. For example, in some embodiments, a receiver device may be configured to select an appropriate physical conditioning video for the user based on the current user and location monitoring data received from personal monitor devices and/or home automation systems. Additionally or alternatively, a receiver may grant or deny access to a particular video requested by a user, by comparing the current user and location monitoring data to a number of user-specific criteria. Such criteria may include, for example, criteria based on the user's current biostatistics, the user's current diet or sleep patterns, the user's recent activities or exercise sessions, the user's current medical status, etc. In some embodiments, the receiver also may enforce user-specific video interrupt conditions, for example, based on the real-time monitoring of the user's biostatistics and other real-time data during the user's exercise session. Further aspects described herein relate to determining multiple distinct video portions within a physical conditioning video, and determining the characteristics of each separate portion, so that user-specific criteria and/or user-specific interrupt conditions may be implemented and enforced for individual portions within a video.

BRIEF DESCRIPTION OF THE DRAWINGS

The present invention is described in conjunction with the appended figures.

Figure 1:
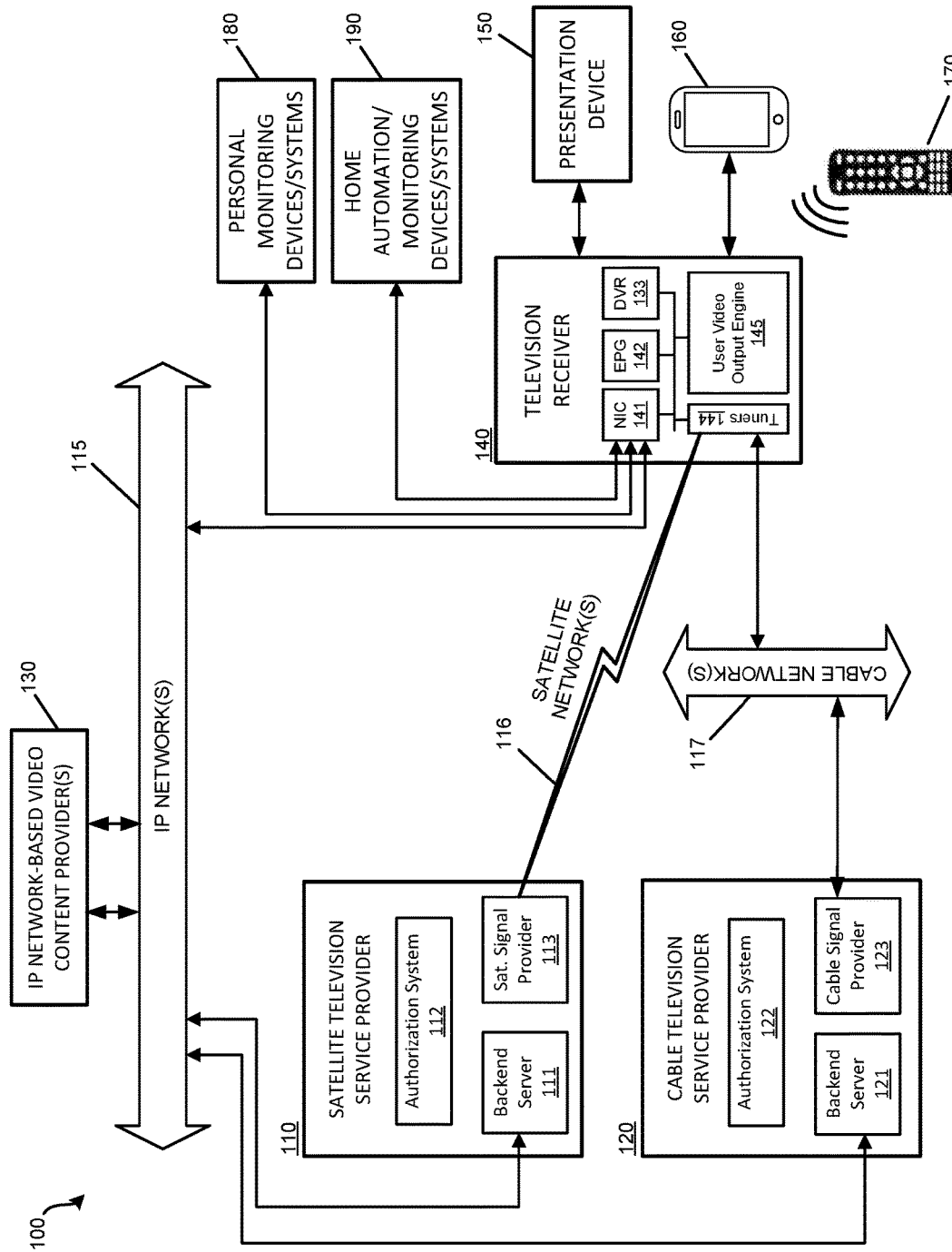
FIG. 1 is a block diagram illustrating a video resource delivery and output system, in accordance with one or more embodiments of the disclosure.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Various techniques (e.g., systems, methods, computer-program products tangibly embodied in a non-transitory computer-readable storage medium, etc.) are described herein for providing and controlling the output of physical conditioning video resources based on user and location monitoring data. In various embodiments, television and/or video receiver devices may receive physical conditioning videos from one or more video content providers. For instance, a user may receive a number of exercise videos from a satellite or cable television provider, as part of an exercise video subscription program. As another example, a user may receive a number of videos from a medical provider (e.g., via an IP network) for assisting with physical therapy (e.g., for elderly or disabled users) or for rehabilitation following an injury. After receiving the physical conditioning videos, the receiver may analyze and/or determine various characteristics of the videos, and corresponding user-specific criteria or video interruption conditions that may be applied when a user plays and interacts with the videos. Then, in response to a user request to commence a physical conditioning video, the receiver may analyze personal user monitoring data and/or location monitoring data, and may use the monitoring data to determine the user's current readiness level to complete the physical conditioning video. For instance, the receiver may compare the current user and location monitoring data to one or more user-specific criteria used to determine whether or not the user may perform an exercise session with a requested video. Finally, the receiver may control the output of the physical conditioning videos based on the user's current readiness level, along with various other user data.

Additional aspects described herein relate to different techniques for controlling the output physical conditioning videos based on user-specific criteria and user-specific video interrupt conditions. For example, in some embodiments, a receiver device may be configured to select an appropriate physical conditioning video for the user based on the current user and location monitoring data received from personal monitor devices and/or home automation systems. Additionally or alternatively, a receiver may grant or deny access to a particular video requested by a user, by comparing the current user and location monitoring data to a number of user-specific criteria. Such criteria may include, for example, criteria based on the user's current biostatistics, the user's current diet or sleep patterns, the user's recent activities or exercise sessions, the user's current medical status, etc. In some embodiments, the receiver also may enforce user-specific video interrupt conditions, for example, based on the real-time monitoring of the user's biostatistics and other real-time data during the user's exercise session. Further aspects described herein relate to determining multiple distinct video portions within a physical conditioning video, and determining the characteristics of each separate portion, so that user-specific criteria and/or user-specific interrupt conditions may be implemented and enforced for individual portions within a video.

The various embodiments described herein may be implemented on and within one or more different networks and systems, including satellite or terrestrial (e.g. cable) television distribution systems, telecommunications network systems, television distribution computer networks such as the Internet, cellular and other mobile networking systems, and the like. Therefore, although certain examples below are described in terms of specific types of user equipment (e.g., set-top boxes and other television receivers having digital video recorders, etc.) within specific systems (e.g., satellite television distribution systems), it should be understood that similar or identical embodiments may be implemented using other network systems and architectures (e.g., cable television networks, on-demand distribution networks, Internet television computer networks), as well as other user equipment and devices (e.g., personal computers, servers, routers, gaming consoles, smartphones, etc.).

Referring now to FIG. 1, an example system 100 for providing and present user-specific and customized video content based on user and location monitoring is shown. Various aspects and embodiments of the present disclosure may be implemented on the video resource delivery and output system 100. In this example, the system 100 includes a television receiver 140 configured to receive television and/or video content from television and/or video service providers 110-130 over various different communication networks 115-117. As discussed below, in various embodiments, different television receivers 140 may support various functionality to receive television and/or video content from one or more of the different television providers 110-130 shown in this example, via one or more of the transmission channels 115-117. In some embodiments, the television receiver 140 also may transmit certain data to backend servers 111 and 121 of the television providers 110 and 120, and to computer network-based content providers 130, via the IP network 115, including orders or requests for specific video content resources, status data and statistics relating to video viewing by users, and user and location monitoring data, etc. The television/video providers 110-130 may use the data received from the receiver 140 via the IP network 115 to determine and provide additional user-specific and customized video content, as well as user-specific criteria for presenting the video content which may be enforced by the receiver 140. In some cases, the data transmitted from the receiver 140 to the one or more content providers 110-130 via the IP network 115 may be secure and/or confidential, and thus may use secure data transmission protocols and/or encryption to protect the user video content requests, transmissions of user monitoring data, location monitoring data, user-specific criteria for viewing certain video resources, etc. Additionally, in some embodiments, user and/or location monitoring data, as well as user-specific criteria for viewing certain video resources, etc., may be transmitted via a first network (e.g., IP network 115) while the video content resources themselves may be transmitted via different networks (e.g., television networks 116-117).

In order to perform these features and the additional functionality described below, each of the components and sub-components shown in example system 100, such as television receiver 140, the servers and systems within the satellite, cable, and computer network-based television providers 110-120, presentation device 150, mobile device 160, remote control 170, personal monitoring device 180, and home automation devices/systems 190, etc., may correspond to a single computing device or server, or to a complex computing system including a combination of computing devices, storage devices, network components, etc. Each of these components and their respective subcomponents may be implemented in hardware, software, or a combination thereof. The components shown in system 100 may communicate via communication networks 115-117 (as well as other communication networks not shown in this figure), either directly or indirectly by way of various intermediary network components, such as satellite system components, telecommunication or cable network components, routers, gateways, firewalls, and the like. Although these physical network components have not been shown in this figure so as not to obscure the other elements depicted, it should be understood that any of the network hardware components and network architecture designs may be implemented in various embodiments to support communication between the television receiver 140, television/video service providers 110-130, and other components within system 100.

The television (and/or video) receiver 140 may be implemented using various specialized user equipment devices, such as cable system set-top boxes, satellite system set-top boxes, WiFi or Internet-based set-top boxes, gaming consoles, and the like. In other examples, the receiver 140 may be implemented using (or integrated into) other computing devices such as personal computers, network routers, tablet computers, mobile devices, etc. Thus, the receiver 140 may be implemented as a single computing device or a computing system including a combination of multiple computing devices, storage devices, network components, etc. In some examples, a television receiver 140 may correspond to a primary television receiver (PTR) 240 which may include one or more network interface components (NICs), an electronic programming guide (EPG) user interface component, a digital video recorder (DVR), and/or a plurality of tuners, and related hardware/software components (e.g., audio/video decoders, descramblers, demultiplexers, etc.) as described below in more detail in FIGS. 2A-2B and 3. In some cases, television receivers 140 may include one or more internal data stores and/or external data stores (e.g., external storage systems, database servers, file-based storage, cloud storage systems, etc.) configured to store television programs (e.g., audio/video files corresponding to television shows or movies, sporting events, live broadcasts, etc.), as well as image data and music/audio content that may be stored on television receivers 140 and output via presentation devices 150 and/or mobile devices 160. In some embodiments, such data stores may reside in a back-end server farm, storage cluster, and/or storage-area network (SAN). As shown in this example, a user video output engine 145 also may be implemented within the television receiver 140 to perform various functionality relating to monitoring personal user data and/or location data, transmitting such monitoring data to back-end systems 110-130, and receiving and enforcing user-specific viewing criteria for certain video resources, as described in more detail below.

As shown in this example, television receiver 140 may be configured to communicate with television and/or video service providers 110-130 over multiple communication networks 115-117. As shown in this example, receiver 140 may receive television and/or video content from multiple television providers simultaneously, including a satellite television service provider 110, a cable television service provider 120, and one or more computer-network based television providers. Although three example providers 110-130 are shown in FIG. 1, it should be understood that any number of different television providers may be used in other embodiments, including embodiments in which a receiver 140 is only in communication with one or two of the providers 110-130, and embodiments in which the receiver 140 is in communication with additional satellite and cable television service provider, on-demand television providers, pay-per-view (PPV) television providers, Internet-based television providers, television streaming services, etc. Additionally, although various components within the television receiver 140 and television service providers 110-130 are illustrated as standalone computer systems in this example, any or all of these components may be implemented within and/or integrated into one or more servers or devices of various content distribution systems and other computing architectures. For example, as discussed below in reference to FIGS. 2A-2B and 3, the user video output engine 145 may be implemented solely within a television receiver 140, or may be implemented within a combination of devices within a television/video distribution system. For example, the user video output engine 145 may be implemented via one or more user video selection services operating within back-end servers 111, 121, and 130, and/or television receivers 140 within a satellite television distribution system 200a. In other embodiments, the user video output engine 145 may be implemented similarly, as a standalone component and/or in a distributed manner, within other types of content distribution systems, such as terrestrial (e.g., cable) television distribution systems, telecommunications network systems, LAN or WAN computer networks (e.g., the Internet), cellular and other mobile networking systems, and any other computing environment configured to provide content. In any of these examples, the user video output engine 145 may be implemented within (or integrated into) television receivers 140 as shown in FIG. 1, and/or within one or more content servers (e.g., satellite hubs, cable headends, Internet servers, etc.), one or more local computing devices (e.g., televisions, television receivers, set-top boxes, gaming consoles, standalone home monitoring stations, network routers, modems, personal computers, and the etc.), or a combination of server-side devices/services and local devices/services.

Television/video content received and/or decoded by television receiver 140 may be presented via one or more presentation devices 150. Presentation devices 150 may correspond to televisions and other television viewing devices (e.g., home computers, tablet computers, smartphones, etc.). Additionally, various user video output systems 100 may incorporate other user equipment and devices, such as mobile devices 160 and remote control devices 170 configured to communicate with associated television receivers 140 and/or presentation devices 150. User devices 160 may include mobile devices such as smartphones and tablet computers, as well as other various types of user computing devices (e.g., personal computers, laptops, home monitoring/security display devices, weather station displays, digital picture frames, smart watches, wearable computing devices, and/or vehicle-based display devices). In some embodiments, user devices 160 may be associated with specific television receivers 140 and/or specific users/customer accounts associated with the receiver 140 and/or system 100. As shown in FIG. 1, user devices 160 may be configured to receive data from and transmit data to an associated television receiver 140. Additionally or alternatively, user devices 160 may be configured to communicate directly with one or more television service providers 110-130, so that certain transmissions of video content and other functionality (e.g., collecting and transmitting user or location monitoring data, receiving and enforcing user-specific criteria for viewing certain video resources, etc.) may potentially bypass the television receiver 140 in some embodiments.

Different presentation devices 150, user devices 160, and remote control devices 170 may include hardware and software components to support a specific set of output capabilities (e.g., LCD display screen characteristics, screen size, color display, video driver, speakers, audio driver, graphics processor and drivers, etc.), and a specific set of input capabilities (e.g., keyboard, mouse, touchscreen, voice control, cameras, facial recognition, gesture recognition, etc.). Different such devices 150-170 may support different input and output capabilities, and thus different types of user notifications and user inputs in response to notifications may be compatible or incompatible with certain devices 150-170. For example, certain notifications generated and output by a television receiver 140, or television/video service providers 110-130, may require specific types of processors, graphics components, and network components in order to be displayed (or displayed optimally) on a user device 160. Additionally, different types of user notifications may include different interactive user response features that require various specific input capabilities for presentation devices 150, user devices 160, and remote control devices 170, such as keyboards, mouses, touchscreens, voice control capabilities, gesture recognition, and the like. In some embodiments, the content of user notifications and/or the user response components may be customized based on the capabilities of the presentation device 150 and/or user device 160 selected to output the notification. Additionally, in some cases, users may establish user-specific preferences, which may be stored in the memory of the television receiver 140, for outputting specific types of user notifications to specific types of presentation devices 150 and/or user devices 160.

System 100 also may include one or more personal monitoring devices or systems 180, and one or more home monitoring and automation devices or systems 190. Personal monitoring devices 180 and home automation devices 190 may include a variety of devices configured to collect and analyze personal user data and/or user location data which may be used to determine current readiness levels for users to complete certain physical conditioning videos. As described below in more detail, the monitoring data collected by a specific user's personal monitoring devices 180 and/or the user's home monitoring devices 190 may be used, for example, to select a particular physical conditioning video appropriate for the user, to restrict access to a particular physical conditioning video requested by the user, to guide or instruct the user during the output of a particular physical conditioning video, and/or to enforce specific criteria that must be satisfied (e.g., performed by the user) before a particular physical conditioning video may be output for the user, etc.

Personal monitoring devices/systems 180 may include, for example, personal and/or wearable computing devices configured to detect current health and activity data of a user. Such devices may include various sensors such as user health and activity sensors, heartrate and blood pressure sensors, sleep monitors, temperature monitors, user movement monitors, and personal exercise/fitness sensors that may detect and track the physical state and condition of the user. In some examples, certain personal monitoring devices may be insertable and/or embedded devices with sensors for monitoring various chemicals within the user's bloodstream, such as continuous glucose monitors, alcohol monitoring systems, and other chemical monitoring systems. Personal monitoring devices 180, whether embedded, insertable, wearable, or entirely external to the user (e.g., external monitoring cameras, microphones, and other sensors), may collect personal user biostatistics data and transmit the user data to the receiver 140 and/or other devices within the system 100.

Home monitoring and automation devices and systems 190 may include networks of one or more location-based sensors, device sensors, and/or appliance sensors configured to collect and analyze data relating to a user location, such as user's home, office, etc. An example of a home monitoring and automation system 190, HAS 400, is described below in FIG. 4. As discussed below, in some embodiments, a home monitoring and automation system 190 may be hosted by receiver 140, and may receive data from various sensors configured to monitor the current home environment and the operation of various home devices or appliances. The home monitoring and automation system 190 may collect such user location data and transmit the data to the receiver 140 and/or other devices within the system 100.

The television receivers 140, television service providers 110-130, presentation devices 150, user devices 160, personal monitoring devices 180, and/or home automation and monitoring devices 190, each may include the necessary hardware and software components to establish network interfaces and transmit/receive video signals or data streams, user monitoring data and video output criteria, and/or user interfaces and notifications, etc. Some or all of these devices may include security features and/or specialized hardware (e.g., hardware-accelerated SSL and HTTPS, WS-Security, firewalls, etc.) in order to present the various confidential data transmitted between components (e.g., user and receiver identification data, user monitoring data, user video viewing data, user criteria and access restriction data for certain video resources, etc.), and to prevent hacking and other malicious access attempts within the system 100. In some cases, the television receivers 140 may communicate with television service providers 110-130, user devices 160, and/or monitoring devices 180-190 using secure data transmission protocols and/or encryption for data transfers, for example, File Transfer Protocol (FTP), Secure File Transfer Protocol (SFTP), and/or Pretty Good Privacy (PGP) encryption. Service-based implementations of the system 100 may use, for example, the Secure Sockets Layer (SSL) or Transport Layer Security (TLS) protocol to provide secure connections between the television receivers 140, video content providers 110-130, user devices 160, and/or monitoring devices 180-190. SSL or TLS may use HTTP or HTTPS to provide authentication and confidentiality.

As shown in this example, receiver 140 and providers 110-130, user devices 160, and/or user and location monitoring device/systems 180-190 may communicate over various different types of networks 115-117. For example, network 115 is an Internet Protocol (IP) network, which may use the Internet networking model and/or communication protocols. IP network 115 may include local area networks (LANs), wide area networks (WANs) (e.g., the Internet), and/or various wireless telecommunications networks. For example, when a user video output engine 145 is implemented within a television receiver 140, wireless router, modem, or other local user equipment, then IP network 115 may include wireless local area networks (WLANs) or other short-range wireless technologies such as Bluetooth®, mobile radio-frequency identification (M-RFID), and/or other such communication protocols. In other examples, when at least a portion or component of a user video output engine is implemented remotely as a service in a backend server 111, 121, or 130, or other computer server, satellite hub, cable headend, etc., then IP network 115 may include one or more WANs (e.g., the Internet), various cellular and/or telecommunication networks (e.g., 3G, 4G or EDGE (enhanced data rates for global evolution), WiFi (IEEE 802.11 family standards, or other mobile communication technologies), or any combination thereof. Additionally, system 100 includes satellite networks 116 and cable data networks 117, which may be used in this example for respectively transmitting satellite video data signals and cable video data signals to television receiver 140 and other user equipment. However, it should be understood that IP network 115 also may include various components of satellite communication networks and/or or terrestrial cable networks in some embodiments. For communication between presentation device 150, user devices 160, remote controls 170, and monitoring devices 180-190, and their associated television receivers 140, then communications may include use of a WLAN and/or other short-range wireless technologies. However, for communication between television receivers 140 and remotely located mobile user devices 160 (and/or for user devices 160 that are configured to communicate directly with television service providers 110-130), and remotely-based located monitoring devices/systems 180-190, then communications may include WANs, satellite networks, terrestrial cable networks, and/or cellular or other mobile telecommunication networks, etc.

As discussed above, various components of the system 100 may be implemented as standalone hardware and software systems, and may be implemented within one or more different computer network systems and architectures. For example, in reference to FIGS. 2A-2B and 3, the system 100 may be implemented using one or more user video output services executing within back-end server hardware 210 and/or television receiver devices 240 within a satellite television distribution system 200a. However, in other embodiments, the components of a system 100 may be incorporated within various different types of content distribution systems.

Figure 2A:
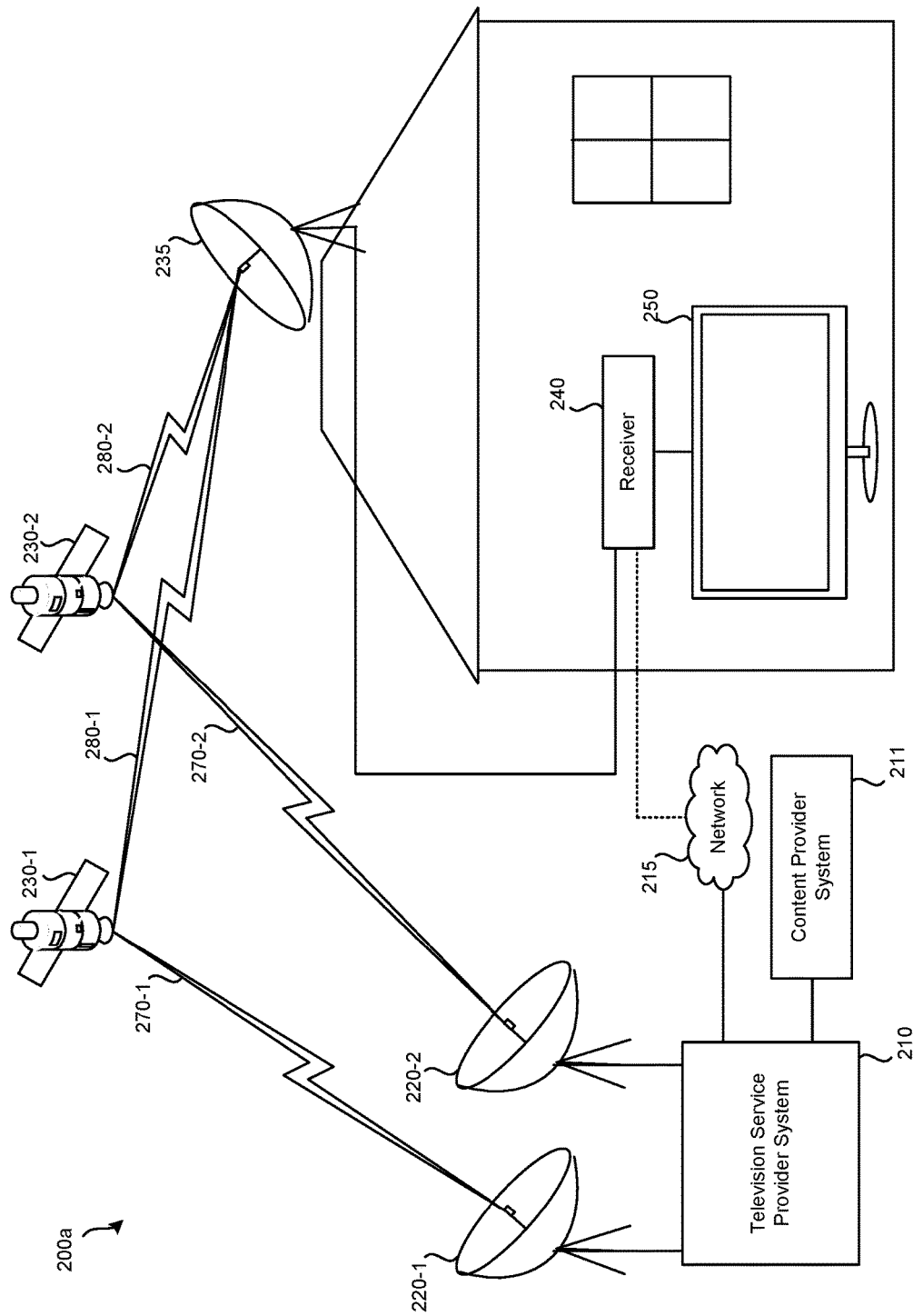
FIG. 2A is a block diagram illustrating an example satellite television distribution system, in accordance with one or more embodiments of the disclosure.
Figure 2B:
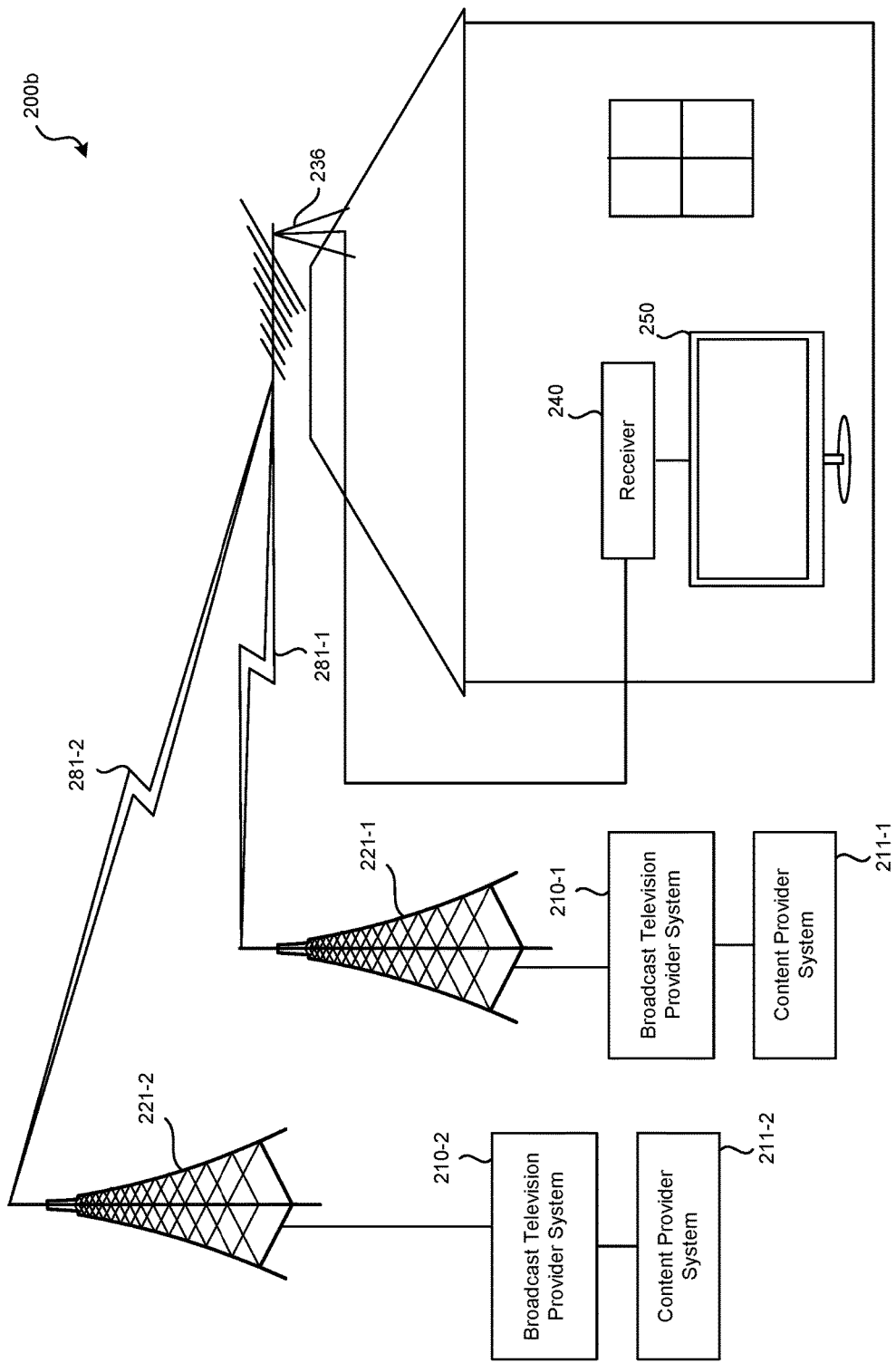
FIG. 2B is a block diagram illustrating an example terrestrial broadcast television system, in accordance with one or more embodiments of the disclosure.
Figure 3:
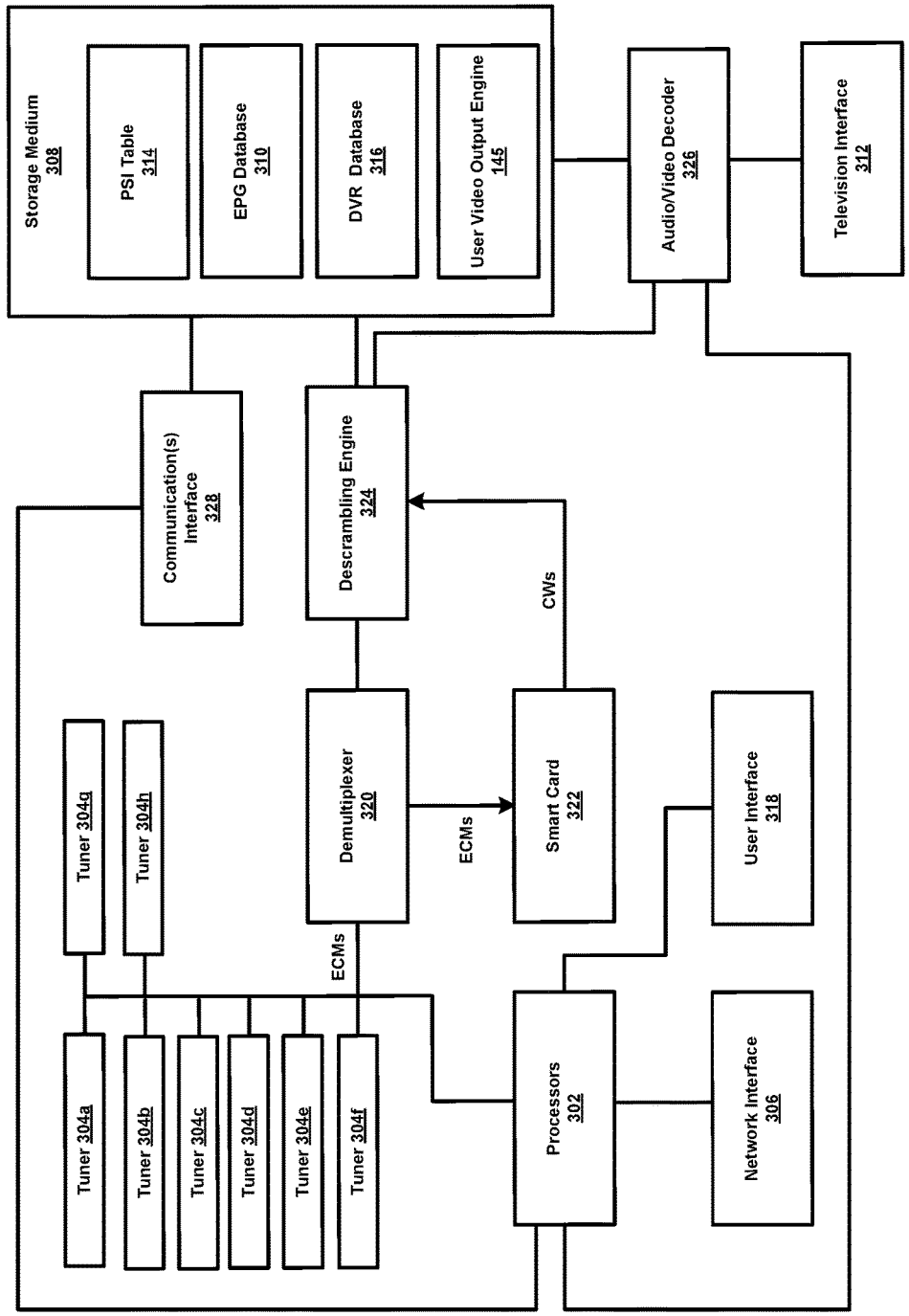
FIG. 3 is a block diagram illustrating an example television receiver device, in accordance with one or more embodiments of the disclosure.

For example, corresponding embodiments to those described in FIGS. 2A-2B and 3 may be implemented within terrestrial cable television distribution systems 200b, telecommunications network systems, LAN or WAN computer networks (e.g., the Internet), cellular and other mobile networking systems, and the like. In any of these examples, a system 100 may be implemented within (or integrated into) one or more content servers (e.g., satellite hubs, cable head ends, Internet servers, etc.), one or more local computing devices (e.g., televisions, television receivers, set-top boxes, gaming consoles, standalone home monitoring/automation systems, network routers, modems, personal computers, and the etc.), or a combination of server-side devices/services and local devices/services. Thus, although not so limited, an appreciation of various aspects of the present disclosure may be gained from the following discussion in connection with FIGS. 2A-2B and 3.

FIG. 2A illustrates an embodiment of a satellite television distribution system 200a. Satellite television distribution system 200a may include: television service provider system 210, satellite transmitter equipment 220-1 and 220-2 (collectively, satellite transmitter equipment 220), satellites 230-1 and 230-2 (collectively, satellites 230), satellite dish 235, receiver 240, and television 250. Alternate embodiments of satellite television distribution system 200a may include fewer or greater numbers of components. While only one satellite dish 235, receiver 240, and television 250 (collectively referred to as "user equipment") are illustrated, it will be appreciated that multiple (e.g., tens, thousands, millions) instances of user equipment may receive television signals from satellites 230. For example, a particular person may have user equipment at multiple homes or other locations.

Television service provider system 210 and satellite transmitter equipment 220 may be operated by a television service provider. A television service provider may distribute television channels, on-demand programming, programming information, and/or other services to viewers. Television service provider system 210 may receive feeds of one or more television channels from various sources, such as content provider system 211. Content provider system 211 may provide television programs, advertisements, and other forms of content. For example, content provider system 211 may be a television network, such as ESPN®. To distribute such television channels to users, feeds of the television channels may be relayed to user equipment via one or more satellites via transponder streams. Satellite transmitter equipment 220 may be used to transmit a feed of one or more television channels from television service provider system 210 to one or more satellites 230. Such satellite feeds may be unidirectional—user equipment may not be able to transmit information back to television service provider system 210 via satellites 230. While a single television service provider system 210 and two satellite transmitter equipment 220 are illustrated as part of satellite television distribution system 200a, it should be understood that multiple instances of transmitter equipment may be used, possibly scattered geographically to communicate with satellites 230. Such multiple instances of satellite transmitting equipment may communicate with the same or with different satellites. Different television channels and content may be transmitted to satellites 230 from different instances of transmitting equipment. For instance, a different satellite dish of transmitting equipment 220 may be used for communication with satellites in different orbital slots.

Satellites 230 may be configured to receive signals, such as streams of television channels, from one or more satellite uplinks, such as from satellite transmitter equipment 220. Satellites 230 may relay received signals from satellite transmitter equipment 220 (and/or other satellite transmitter equipment) to multiple instances of user equipment via transponder streams. Different frequencies may be used for uplink signals 270-1 and 270-2 (collectively, uplink signals 270) from downlink signals 280-1 and 280-2 (collectively, downlink signals 280). Satellites 230 may be in geosynchronous orbit. Each satellite 230 may be in a different orbital slot, such that the signal path between each satellite, uplink stations, and user equipment vary. Multiple satellites 230 may be used to relay television channels from television service provider system 210 to satellite dish 235. Different television channels may be carried using different satellites. Different television channels may also be carried using different transponders of the same satellite; thus, such television channels may be transmitted at different frequencies and/or different frequency ranges. As an example, a first and second television channel may be carried on a first transponder of satellite 230-1. A third, fourth, and fifth television channel may be carried using a different satellite or a different transponder of the same satellite relaying the transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment.

Satellite dish 235 may be a piece of user equipment that is used to receive transponder streams from one or more satellites, such as satellites 230. Satellite dish 235 may be provided to a user for use on a subscription basis to receive television channels provided by the television service provider system 210, satellite uplink 220, and/or satellites 230. Satellite dish 235 may be configured to receive transponder streams from multiple satellites and/or multiple transponders of the same satellite. Satellite dish 235 may be configured to receive television channels via transponder streams on multiple frequencies. Based on the characteristics of receiver 240 and/or satellite dish 235, it may only be possible to capture transponder streams from a limited number of transponders concurrently. For example, a tuner of receiver 240 may only be able to tune to a single transponder stream from a transponder of a single satellite at a time.

In communication with satellite dish 235, may be one or more sets of receiving equipment. Receiving equipment may be configured to decode signals received from satellites 230 via satellite dish 235 for display on a display or presentation device, such as television 250. Receiving equipment may be incorporated as part of a television or may be part of a separate device, commonly referred to as a set-top box (STB). Receiving equipment may include a satellite tuner configured to receive television channels via a satellite. In FIG. 2A, receiving equipment is present in the form of receiver 240, which may be a STB. Alternatively, receiver 240 may be integrated directly into television 250. Receiver 240 may thus decode signals received via satellite dish 235 and provide an output to television 250. FIG. 3 provides additional detail of receiving equipment.

Television 250 may be used to present video and/or audio decoded by receiver 240. Receiver 240 may also output a display of one or more interfaces to television 250, such as an electronic programming guide (EPG). In some embodiments, a display device other than a television may be used. In some examples, receiver 240 may correspond to receiver 140, television service provider system 210 may correspond to satellite television service provider 110, and network 215 may correspond to IP network 115, described above in FIG. 1. Additionally, various hardware and software components/features of receiver 240 in certain embodiments are described below in FIG. 3.

Uplink signal 270-1 represents a signal between satellite uplink 220-1 and satellite 230-1. Uplink signal 270-2 represents a signal between satellite uplink 220-2 and satellite 230-2. Each of uplink signals 270 may contain streams of one or more different television channels. For example, uplink signal 270-1 may contain a certain group of television channels, while uplink signal 270-2 contains a different grouping of television channels. Each of these television channels may be scrambled such that unauthorized persons are prevented from accessing the television channels.

Transponder stream 280-1 represents a signal between satellite 230-1 and satellite dish 235. Transponder stream 280-2 represents a signal path between satellite 230-2 and satellite dish 235. Each of transponder streams 280 may contain one or more different television channels in the form of transponder streams, which may be at least partially scrambled. For example, transponder stream 280-1 may include a first transponder stream containing a first group of television channels, while transponder stream 280-2 may include a second transponder stream containing a different group of television channels. A satellite may transmit multiple transponder streams to user equipment. For example, a typical satellite may relay 32 transponder streams via corresponding transponders to user equipment. Further, spot beams are possible. For example, a satellite may be able to transmit a transponder stream to a particular geographic region (e.g., to distribute local television channels to the relevant market). Different television channels may be transmitted using the same frequency of the transponder stream to a different geographic region.

FIG. 2A illustrates transponder stream 280-1 and transponder stream 280-2 being received by satellite dish 235. For a first group of television channels, satellite dish 235 may receive a transponder stream of transponder stream 280-1; for a second group of channels, a transponder stream of transponder stream 280-2 may be received. Receiver 240 may decode the received transponder stream. As such, depending on which television channel(s) are desired, a transponder stream from a different satellite (or a different transponder of the same satellite) may be accessed and decoded by receiver 240. Further, while two satellites are present in satellite television distribution system 200a, in other embodiments greater or fewer numbers of satellites may be present for receiving and transmitting transponder streams to user equipment.

Network 215 may serve as a secondary communication channel between television service provider system 210 and receiver 240. Via such a secondary communication channel, bidirectional exchange of data may occur. As such, data may be transmitted to television service provider system 210 via network 215. The connection between network 215 and receiver 240 is illustrated as dotted since this connection allowing communications from receiver 240 to be sent to television service provider system 210 may not be available (e.g., receiver 240 may not have such communication capabilities, receiver 240 may have such capabilities but may not be connected with network 215). For example, even if a receiver is capable of communicating using network 215, communication using network 215 may require that the user has an active account with an internet service provider (ISP). Accordingly, some receivers may only be able to receive data from satellites 230 via receiving equipment, such as satellite dish 235. In other situations, while a user may have an active ISP account, such as via a fiber, cable, or DSL internet connection, equipment failure may occur. For instance, a router through which receiver 240 connects to network 215 may fail or be in need of resetting. Network 215 may be or include the Internet.

FIG. 2A illustrates an example of a satellite-based television channel distribution system. It should be understood that at least some of the aspects of the satellite-based television channel distribution system may be similar to a cable television distribution system. For example, in a cable television system, rather than using satellite transponders, multiple RF channels on a coaxial cable may be used to transmit streams of television channels. Alternatively or additionally, digital data may be transmitted across fiber optic cables. As such, aspects detailed herein may be applicable to cable television distribution systems. Other forms of television distribution networks include broadcast over-the-air systems and IP-based distribution systems.

FIG. 2B illustrates an embodiment of a terrestrial broadcast television system 200b. Broadcast television system 200b may include elements similar to satellite television broadcast distribution system 200a, and may include: broadcast television provider system 210-1 and 210-2 (collectively, broadcast television provider system 210), transmitter equipment 221-1 and 221-2 (collectively, transmitter equipment 221), antenna 236, receiver 240, and television 250. Transmitter equipment 221 may include one or more broadcast antennas for transmitting radio frequency broadcasts. For example, receiver 240 may include one or more tuner devices for receiving and decoding broadcast signals received at antenna 236. Alternate embodiments of broadcast television system 200b may include fewer or greater numbers of components. While only one antenna 236, receiver 240, and television 250 (collectively referred to as "user equipment") are illustrated, it will be appreciated that multiple (e.g., tens, thousands, millions) instances of user equipment may receive the broadcasted television signals from transmitter equipment 221.

Broadcast television provider system 210 and transmitter equipment 221 may be operated by a broadcast television service provider. A broadcast television service provider may distribute television channels using radio frequency broadcasts. Broadcast television service provider system 210 may receive feeds of one or more television channels from various sources, such as a content provider system. A content provider system may provide television programs, advertisements, and other forms of content. For example, content provider system may be a television network, such as ABC®. To distribute such television channels to users, feeds of the television channels may be relayed to user equipment via one or more transmitters via broadcast digital transport streams. Transmitter equipment 222 may be used to transmit a feed of one or more television channels from television service provider system 210 for reception by an antenna 236. Such broadcasts are generally unidirectional—user equipment may not be able to transmit information back to television service provider system 210 via antenna 236. Although two broadcast television provider systems 210 and two transmitter equipment 221 are illustrated as part of broadcast television system 200b, it should be understood that one or more instances of transmitter equipment may be used, possibly scattered geographically. In addition, independent broadcast networks may use their own set of one or more transmitter equipment and systems for broadcasting different television channels.

Antenna 236 may be configured to receive signals, such as streams of television channels, from one or more transmitter equipment 221. Broadcast signals 281-1 and 281-2 are depicted as being transmitted from transmitter equipment 221-1 and 221-2, but it will be appreciated that transmitter equipment 221 generally broadcasts streams of television channels over large areas for reception by any appropriate antenna for displaying the broadcast television channel streams without regard to whether any other antennas are receiving the broadcast signals.

In addition, different television channels may be carried on a single broadcast signal 281 using digital subchannels. As an example, a first television channel may be carried on a first digital subchannel of broadcast signal 281 and a second television channel may be carried on a second digital subchannel of broadcast signal 281. In this way, a broadcast television provider may simultaneously broadcast multiple television channel streams using a single transmitter equipment 221 for simultaneous reception by a single antenna 236 and receiver 240.

Antenna 236 may be a piece of user equipment that is used to receive broadcast digital transport streams from one or more transmitters, such as transmitter equipment 221. Antenna 236 may be installed by a user at a suitable point for reception of broadcast signals 281. Antenna 236 may be an omnidirectional antenna, a directional antenna, an amplified antenna, a planar antenna, etc., depending on the configuration. Based on the characteristics of receiver 240 and/or antenna 236, it may only be possible to capture broadcast digital transport streams from a limited number of transmitter equipment concurrently. For example, a tuner of receiver 240 may only be able to tune to a single digital transport stream on a single radio frequency at a time. Receiver 240, however, may include multiple tuners to overcome this limitation.

Receiver 240 may be configured to decode signals received from transmitter equipment 221 via antenna 236 for display on a display or presentation device, such as television 250. Receiver 240 may be incorporated as part of a television or may be part of a separate device, such as a set-top box (STB). Receiver 240 may include tuner configured to receive broadcast television signals. Receiver 240 may thus decode signals received via antenna 236 and provide an output to television 250. Receiver 240 may, in some examples, correspond to receiver 140 described above in FIG. 1. Various hardware and software components/features that may be included in receiver 240 in certain embodiments are described below in FIG. 3.

Television 250 may be used to present video and/or audio decoded by receiver 240. Receiver 240 may also output a display of one or more interfaces to television 250, such as an electronic programming guide (EPG). In some embodiments, a display device other than a television may be used.

Broadcast signal 281-1 represents a signal between transmitter equipment 221-1 and antenna 236. Broadcast signal 281-2 represents a signal path between transmitter equipment 221-2 and antenna 236. Each of broadcast signals 281 may contain one or more different television channels in the form of digital transport streams. For example, broadcast signal 281-1 may include a first digital transport stream containing a first group of television channels, while broadcast signal 281-2 may include a second digital transport stream containing a different group of television channels. Transmitter equipment 221 may transmit multiple digital transport streams to user equipment. For example, a typical transmitter equipment may relay a digital transport stream including one or more television channels in the form of a multiplexed transport stream.

Referring now to FIG. 3, an example block diagram of a primary television receiver (PTR) 240 of FIGS. 2A-2B is shown in accordance with the disclosure. In some examples, one or more secondary television receivers (STRs) at the same location (e.g., home, office, etc.) may be configured in a manner similar to that of the PTR 240. In some examples, the STRs may be configured and arranged to exhibit a reduced functionality as compared to the PTR 240, and may depend at least to a certain degree on the PTR 240 to implement certain features or functionality. The STRs in such examples may be referred to as "thin clients."

In this example, the receiver device 240 may include one or more processors 302, a plurality of tuners 304a-h, at least one network interface 306, at least one non-transitory computer-readable storage medium 308, at least one EPG database 310, at least one television interface 312, at least one PSI (Program Specific Information) table 314, at least one DVR database 316, at least one user interface 318, at least one demultiplexer 320, at least one smart card 322, at least one descrambling engine 324, at least one decoder 326, and at least one communication interface 328. In other examples, fewer or greater numbers of components may be present. Further, functionality of one or more components may be combined; for example, functions of the descrambling engine 324 may be performed by the processors 302. Still further, functionality of components may be distributed among additional components, and possibly additional systems such as, for example, in a cloud-computing implementation.

The processors 302 may include one or more specialized and/or general-purpose processors configured to perform processes such as tuning to a particular channel, accessing and displaying EPG information, and/or receiving and processing input from a user. For example, the processors 302 may include one or more processors dedicated to decoding video signals from a particular format, such as according to a particular MPEG (Motion Picture Experts Group) standard, for output and display on a television, and for performing or at least facilitating decryption or descrambling.

The tuners 304a-h may be used to tune to television channels, such as television channels transmitted via satellites 220 and/or transmitter equipment 22. Each one of the tuners 304a-h may be capable of receiving and processing a single stream of data from a satellite transponder, or a cable RF channel, at a given time. As such, a single tuner may tune to a single transponder or, for a cable network, a single cable channel. Additionally, one tuner (e.g., tuner 304a) may be used to tune to a television channel on a first transponder stream for display using a television, while another tuner (e.g., tuner 304b) may be used to tune to a television channel on a second transponder for recording and viewing at some other time. If multiple television channels transmitted on the same transponder stream are desired, a particular tuner (e.g., tuner 304c) may be used to receive the signal containing the multiple television channels for presentation and/or recording of each of the respective multiple television channels, such as in a PTAT (Primetime Anytime) implementation for example. Although eight tuners 304a-h are shown in this example, the receiver device 240 may include more or fewer tuners (e.g., three tuners, sixteen tuners, etc.), and the features of the disclosure may be implemented similarly and scale according to the number of tuners of the receiver 240.

The network interface 306 may be used to communicate via alternate communication channel(s) with a service provider. For example, the primary communication channel between television service providers 110-120 and the receiver device 240 may be via satellite or cable networks 116 and 117, which may be unidirectional to the receiver 240, and another communication channel between the television service providers 110-120 and the receiver 240, which may be bidirectional, may be via the network 115. In general, various types of information may be transmitted and/or received via the network interface 306.

The storage medium 308 may represent a non-transitory computer-readable storage medium. The storage medium 308 may include memory and/or a hard drive. The storage medium 308 may be used to store information received from one or more satellites and/or information received via the network interface 306. For example, the storage medium 308 may store information related to the EPG database 310, the PSI table 314, and/or the DVR database 316, among other elements or features, such as the user video output engine 145 discussed above. Recorded television programs may be stored using the storage medium 308 and ultimately accessed therefrom.

The EPG database 310 may store information related to television channels and the timing of programs appearing on such television channels. Information from the EPG database 310 may be used to inform users of what television channels or programs are available, popular and/or provide recommendations. Information from the EPG database 310 may be used to generate a visual interface displayed by a television that allows a user to browse and select television channels and/or television programs for viewing and/or recording. Information used to populate the EPG database 310 may be received via the network interface 306 and/or via satellite, cable, or computer networks 115-117. For example, updates to the EPG database 310 may be received periodically or at least intermittently via satellite or cable television provider. The EPG database 310 may serve as an interface for a user to control DVR functions of the receiver 240, and/or to enable viewing and/or recording of multiple television channels simultaneously.

The decoder 326 may convert encoded video and audio into a format suitable for output to a display device. For instance, the decoder 326 may receive MPEG video and audio from the storage medium 308 or the descrambling engine 324, to be output to a television. MPEG video and audio from the storage medium 308 may have been recorded to the DVR database 316 as part of a previously-recorded television program. The decoder 326 may convert the MPEG video and audio into a format appropriate to be displayed by a television or other form of display device and audio into a format appropriate to be output from speakers, respectively. The decoder 326 may be a single hardware element capable of decoding a finite number of television channels at a given time, such as in a time-division arrangement. In the example embodiment, eight television channels may be decoded concurrently or simultaneously.

The television interface 312 output a signal to a television, or another form of display device, in a proper format for display of video and play back of audio. As such, the television interface 312 may output one or more television channels, stored television programming from the storage medium 308, such as television programs from the DVR database 316 and/or information from the EPG database 310 for example, to a television for presentation.

The PSI table 314 may store information used by the receiver 240 to access various television channels. Information used to populate the PSI table 314 may be received via satellite, or cable, through the tuners 304a-h and/or may be received via the network interface 306 over the computer network 115 from one or more of the providers 110-130. Information present in the PSI table 314 may be periodically or at least intermittently updated. Information that may be present in the PSI table 314 may include: television channel numbers, satellite identifiers, frequency identifiers, transponder identifiers, ECM PIDs (Entitlement Control Message, Packet Identifier), one or more audio PIDs, and video PIDs. A second audio PID of a channel may correspond to a second audio program, such as in another language. In some examples, the PSI table 314 may be divided into a number of tables, such as a MT (Network Information Table), a PAT (Program Association Table), and a PMT (Program Management Table).

Table 1 below provides a simplified example of the PSI table 314 for several television channels. It should be understood that in other examples, many more television channels may be represented in the PSI table 314. The PSI table 314 may be periodically or at least intermittently. As such, television channels may be reassigned to different satellites and/or transponders, and the PTR 210 may be able to handle this reassignment as long as the PSI table 314 is updated.

TABLE 1

| Channel | Satellite | Transponder | ECM PID | Audio PIDs | Video PID |
|---------|-----------|-------------|---------|------------|-----------|
| 4 | 1 | 2 | 27 | 2001 | 1011 |
| 5 | 2 | 11 | 29 | 2002 | 1012 |
| 7 | 2 | 3 | 31 | 2003 | 1013 |
| 13 | 2 | 4 | 33 | 2003, 2004 | 1013 |

It should be understood that the values provided in Table 1 are for example purposes only. Actual values, including how satellites and transponders are identified, may vary. Additional information may also be stored in the PSI table 314. Video and/or audio for different television channels on different transponders may have the same PIDs. Such television channels may be differentiated based on which satellite and/or transponder to which a tuner is tuned.

DVR functionality of the receiver device 240 may permit a television channel to be recorded for a period of time. The DVR database 316 may store timers that are used by the processors 302 to determine when a television channel should be tuned to and recorded to the DVR database 316 of storage medium 308. In some examples, a limited amount of space of the storage medium 308 may be devoted to the DVR database 316. Timers may be set by the television/video service providers 110=130 and/or one or more users of the receiver 240. DVR functionality of the receiver device 240 may be configured by a user to record particular television programs. The PSI table 314 may be used by the receiver device 240 to determine the satellite, transponder, ECM PID, audio PID, and video PID.

The user interface 318 may include a remote control, physically separate from receiver device 240, and/or one or more buttons on the receiver device 240 that allows a user to interact with the receiver device 240. The user interface 318 may be used to select a television channel for viewing, view information from the EPG database 310, and/or program a timer stored to the DVR database 316 wherein the timer may be used to control the DVR functionality of the receiver device 240.

Referring back to the tuners 304a-h, television channels received via satellite may contain at least some encrypted or scrambled data. Packets of audio and video may be scrambled to prevent unauthorized users, such as nonsubscribers, from receiving television programming without paying the television service providers 110-130. When one of the tuners 304a-h is receiving data from a particular transponder of a satellite, the transponder stream may be a series of data packets corresponding to multiple television channels. Each data packet may contain a PID, which in combination with the PSI table 314, can be determined to be associated with a particular television channel. Particular data packets, referred to as ECMs may be periodically transmitted. ECMs may be encrypted; the receiver device 240 may use the smart card 322 to decrypt ECMs.

The smart card 322 may function as the CA (Controlled Access) which performs decryption of encryption data to obtain control words that are used to descramble video and/or audio of television channels. Decryption of an ECM may only be possible when the user (e.g., an individual who is associated with the receiver device 240) has authorization to access the particular television channel associated with the ECM. When an ECM is received by the demultiplexer 320 and the ECM is determined to correspond to a television channel being stored and/or displayed, the ECM may be provided to the smart card 322 for decryption.

When the smart card 322 receives an encrypted ECM from the demultiplexer 320, the smart card 322 may decrypt the ECM to obtain some number of control words. In some examples, from each ECM received by the smart card 322, two control words are obtained. In some examples, when the smart card 322 receives an ECM, it compares the ECM to the previously received ECM. If the two ECMs match, the second ECM is not decrypted because the same control words would be obtained. In other examples, each ECM received by the smart card 322 is decrypted; however, if a second ECM matches a first ECM, the outputted control words will match; thus, effectively, the second ECM does not affect the control words output by the smart card 322. When an ECM is received by the smart card 322, it may take a period of time for the ECM to be decrypted to obtain the control words. As such, a period of time, such as about 0.2-0.5 seconds, may elapse before the control words indicated by the ECM can be obtained. The smart card 322 may be permanently part of the receiver device 240 or may be configured to be inserted and removed from the receiver device 240.

The demultiplexer 320 may be configured to filter data packets based on PIDs. For example, if a transponder data stream includes multiple television channels, data packets corresponding to a television channel that are not desired to be stored or displayed by the user may be ignored by the demultiplexer 320. As such, only data packets corresponding to the one or more television channels desired to be stored and/or displayed may be passed to either the descrambling engine 324 or the smart card 322; other data packets may be ignored. For each channel, a stream of video packets, a stream of audio packets and/or a stream of ECM packets may be present, each stream identified by a PID. In some examples, a common ECM stream may be used for multiple television channels. Additional data packets corresponding to other information, such as updates to the PSI table 314, may be appropriately routed by the demultiplexer 320.

The descrambling engine 324 may use the control words output by the smart card 322 in order to descramble video and/or audio corresponding to television channels for storage and/or presentation. Video and/or audio data contained in the transponder data stream received by the tuners 304a-h may be scrambled. The video and/or audio may be descrambled by the descrambling engine 324 using a particular control word. The control word output by the smart card 322 to be used for successful descrambling may be indicated by a scramble control identifier present within the data packet containing the scrambled video or audio. Descrambled video and/or audio may be output by the descrambling engine 324 to the storage medium 308 for storage, such as part of the DVR database 316 for example, and/or to the decoder 326 for output to a television or other presentation equipment via the television interface 312.

The communication interface 328 may be used by the receiver device 240 to establish a communication link or connection between the receiver device 240 and one or more of the computing systems and devices as shown in FIGS. 1 and 2A-2B, discussed further below. It is contemplated that the communication interface 328 may take or exhibit any form as desired, and may be configured in a manner so as to be compatible with a like component or element incorporated within or to a particular one of the computing systems and devices as shown in FIGS. 1 and 2A-2B, and further may be defined such that the communication link may be wired and/or or wireless. Example technologies consistent with the principles or aspects of the present disclosure may include, but are not limited to, Bluetooth®, WiFi, NFC (Near Field Communication), HomePlug®, and/or any other communication device or subsystem similar to that discussed below.

For brevity, the receiver device 240 is depicted in a simplified form, and may generally include more or fewer elements or components as desired, including those configured and/or arranged for transmitting receiver identification data, subscription packages selections, television viewing data, and the like, to television provider servers, receiving authorization codes, and using the authorization codes to program/configure the components of the receiver device 240 to decode and output authorized television content, in accordance with the principles of the present disclosure. For example, the receiver 240 is shown in FIG. 3 to include an instance of the user video output engine 145 as mentioned above in connection with FIG. 1. In other examples, the receiver device 240 may include a user video output 245, that is configured to communicate with a corresponding service 240 in a back-end server of a content provider (e.g., 111, 121, or 130). While shown stored to the storage medium 308 as executable instructions, a user video output engine 145 (and/or service) could, wholly or at least partially, be stored to the processor(s) 302 of the receiver 240. Further, some routing between the various modules of receiver 240 has been illustrated. Such illustrations are for exemplary purposes only. The state of two modules not being directly or indirectly connected does not indicate the modules cannot communicate. Rather, connections between modules of the receiver 240 are intended only to indicate possible common data routing. It should be understood that the modules of the receiver 240 may be combined into a fewer number of modules or divided into a greater number of modules.

Additionally, although not explicitly shown in FIG. 3, the receiver device 240 may include one or more logical modules configured to implement a television steaming media functionality that encodes video into a particular format for transmission over the Internet such as to allow users to remotely view and control a home cable, satellite, or personal video recorder system from an Internet-enabled computer with a broadband Internet connection. The Slingbox® by Sling Media, Inc. of Foster City, Calif., is one example of a product that implements such functionality. Further, the receiver 240 may be configured to include any number of other various components or logical modules that are implemented in hardware, software, firmware, or any combination thereof, and such components or logical modules may or may not be implementation-specific.

Figure 4:
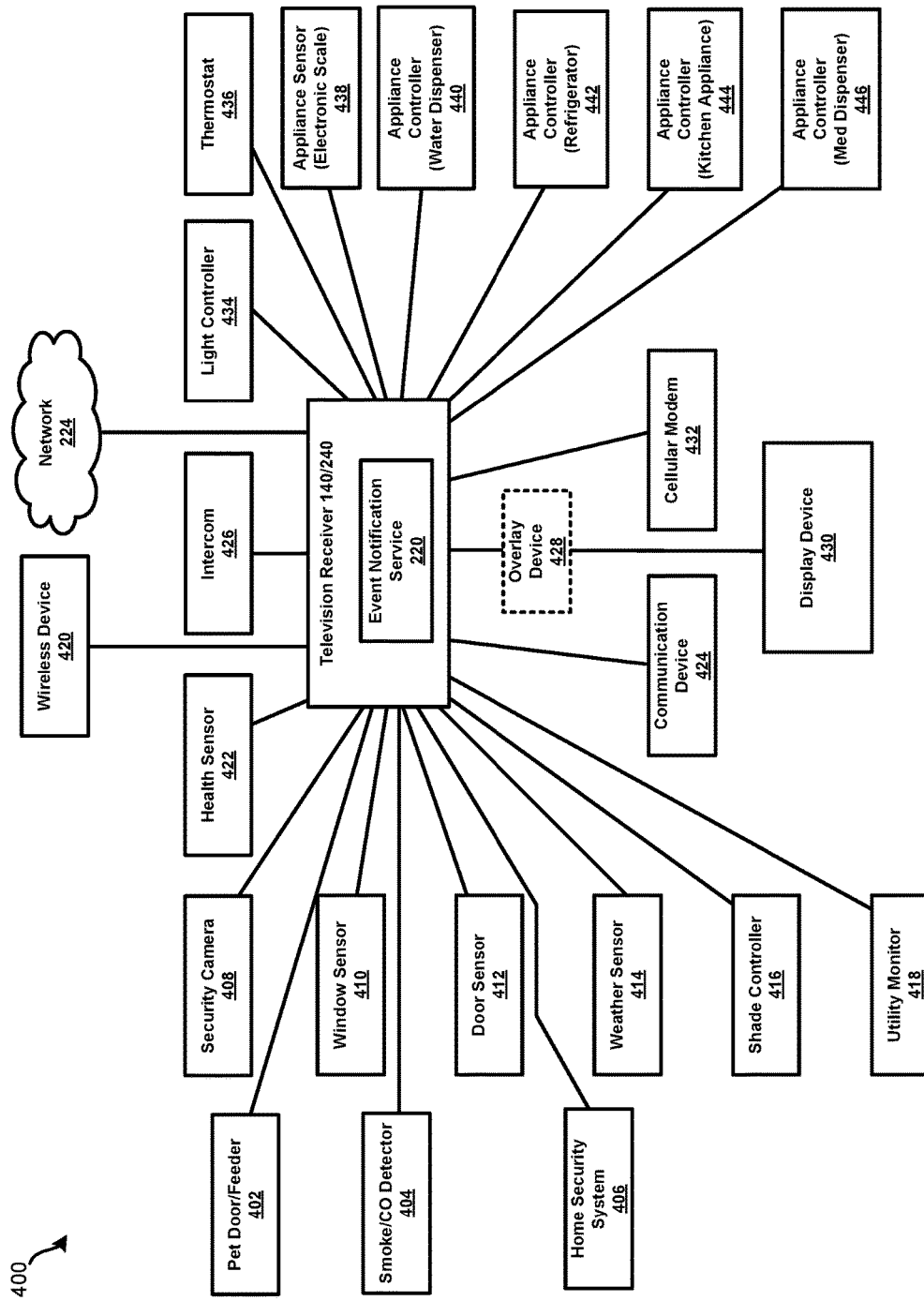
FIG. 4 is a block diagram illustrating a home automation system, in accordance with one or more embodiments of the disclosure.

Referring now to FIG. 4, an example home automation system (HAS) 400 is shown in accordance with certain embodiments. As discussed above, home monitoring and automation devices and systems 400 may be used to collect and analyze data relating to monitor the current home environment and the operation of various home devices or appliances, in order to determine a user's current readiness level to complete certain physical conditioning videos. In this example, the home automation system 400 may be hosted by a receiver device 240 as shown in FIGS. 2A-2B and 3 (which also may correspond to receiver 140 of FIG. 1), and thus the receiver 240 may be considered a home automation gateway device or system. An overlay device 428 is also shown in FIG. 4. In another example, the HAS 400 may be hosted by the overlay device 428 of FIG. 4, and thus the overlay device 428 may be considered a home automation gateway device or system. Still other examples are possible. For instance, in some example, features or functionality of the overlay device 428 may be wholly or at least partially incorporated into the receiver device 240 (and vice versa), so that the HAS 400 may be considered to be hosted or managed or controlled by both receiver 240 and the overlay device 428. In this manner, the receiver 240, the overlay device 428, or any combination of functionality thereof, may be considered the central feature or aspect of the example HAS 400. Additionally, in still other examples, the HAS 400 might not be hosted by a receiver 240 or an overlay device, but may be operated by a standalone device 190 that may communicate with one or more receivers via an IP network 115 or other local communication protocols.

In this example, the receiver device 240 and/or the overlay device 428 may be configured and/or arranged to communicate with multiple sensor devices, including at least the various in-home or on-residence home automation-related systems and/or devices shown in FIG. 4. Some examples of sensor devices may include, but are not limited to: at least one pet door/feeder 402, at least one smoke/$CO_2$ detector 404, a home security system 406, at least one security camera 408, at least one window sensor 410, at least one door sensor 412, at least one weather sensor 414, at least one shade controller 416, at least one utility monitor 418, at least one third party device 420, at least one health sensor 422, at least one communication device 424, at least one intercom 426, at least one overlay device 428, at least one display device 430, at least one cellular modem 432, at least one light controller 434, at least one thermostat 436, and one or more appliance sensors/controllers (e.g., scale sensor 438, water dispenser controller 440, refrigerator controller 442, a kitchen appliance controller 444, and an electronic medication dispenser 446). It should be understood that the HAS 400 depicted in FIG. 4 is just one example, and that other examples are possible as discussed further below.

In various embodiments, each of the elements of FIG. 4, with which the receiver device 240 communicates, may use different communication standards. For example, one or more elements may use or otherwise leverage a ZigBee® communication protocol, while one or more other devices may communicate with the receiver 240 using a Z-Wave® communication protocol. As another example, one or more elements may use or otherwise leverage a WiFi communication protocol, while one or more other devices may communicate with the receiver 240 using a Bluetooth communication protocol. Any combination thereof is further contemplated, and other forms of wireless communication may be used by particular elements of FIG. 4 to enable communications to and from the receiver 240, such as any particular IEEE (Institute of Electrical and Electronics Engineers) standard or specification or protocol, such as the IEEE 802.11 technology for example.

In some examples, a separate device may be connected with the receiver 240 to enable communication with the smart home automation systems or devices of FIG. 4. For instance, the communication device 424 as shown coupled with the receiver device 240 may take the form of a dongle. In some examples, the communication device 424 may be configured to allow for Zigbee®, Z-Wave®, and/or other forms of wireless communication. In some example, the communication device 424 may connect with the receiver 240 via a USB (Universal Serial Bus) port or via some other type of (e.g., wired) communication port. Accordingly, the communication device 424 may be powered by the receiver 240 or may be separately coupled with another different particular power source. In some examples, the receiver 240 may be enabled to communicate with a local wireless network and may use communication device in order to communicate with devices that use a ZigBee® communication protocol, Z-Wave® communication protocol, and/or some other wireless communication protocols.

In some examples, the communication device 424 may also serve to allow or enable additional components to be connected with the receiver device 240. For instance, the communication device 424 may include additional audio/video inputs (e.g., HDMI), component, and/or composite inputs to allow for additional devices (e.g., Blu-Ray players) to be connected with the receiver 240. Such a connection may allow video comprising home automation information to be "overlaid" with television programming, both being output for display by a particular presentation device. Whether home automation information is overlaid onto video on display may be triggered based on a press of a remote control button by an end-user.

Regardless of whether the receiver 240 uses the communication device 242 to communicate with any particular home automation device shown in FIG. 4 or other particular home automation device not explicitly shown in receiver 240, the receiver 240 may be configured to output home automation information for presentation via the display device 430. It is contemplated that the display device 430 could correspond to any particular one of the televisions and/or user devices describes above in FIGS. 1-3. Still other examples are possible. Such information may be presented simultaneously, concurrently, in tandem, etc., with any particular television programming received by the receiver 240 via any particular communication channel as discussed above. It is further contemplated that the receiver 240 may also, at any particular instant or given time, output only television programming or only home automation information based on preferences or commands or selections of particular controls within an interface of or by any particular end-user. Furthermore, an end-user may be able to provide input to the receiver 240 to control the HAS 400, in its entirety as hosted by the receiver 240 or by the overlay device 428, as discussed further below.

In some examples (indicated by intermittent line in FIG. 4), the overlay device 428 may be coupled with the receiver 240 to allow or enable home automation information to be presented via the display device 430. It is contemplated that the overlay device 428 may be configured and/or arranged to overlay information, such as home automation information, onto a signal that will ultimately enable the home automation information to be visually presented via the display device 430. In this example, the receiver 240 may receive, decode, descramble, decrypt, store, and/or output television programming. The receiver 240 may output a signal, such as in the form of an HDMI signal. Rather than being directly input to the display device 430, however, the output of the receiver 240 may be input to the overlay device 428. Here, the overlay device 428 may receive video and/or audio output from the receiver 240.

The overlay device 428 may add additional information to the video and/or audio signal received from the receiver 240 so as to modify or augment or even "piggyback" on the same. That video and/or audio signal may then be output by the overlay device 428 to the display device 430 for presentation thereon. In some examples, the overlay device 428 may include or exhibit an HDMI input/output, with the HDMI output being connected to the display device 430. While FIG. 4 shows lines illustrating communication between the receiver device 240 and other various devices, it will be appreciated that such communication may exist, in addition or in alternate via the communication device 424 and/or the overlay device 428. In other words, any particular input to the receiver 240 as shown in FIG. 4 may additionally, or alternatively, be supplied as input to one or both of the communication device 424 and the overlay device 428.

As alluded to above, the receiver 240 may be used to provide home automation functionality, but the overlay device 428 may be used to modify a particular signal so that particular home automation information may be presented via the display device 430. Further, the home automation functionality as detailed throughout in relation to the receiver 240 may alternatively be provided by or via the overlay device 428. Using the overlay device 428 to present automation information via the display device 430 may be beneficial and/or advantageous in many respects. For instance, it is contemplated that multiple devices may provide input video to the overlay device 428. For instance, the receiver 240 may provide television programming to the overlay device 428, a DVD/Blu-Ray player may provide video to the overlay device 428, and a separate IPTV device may stream other programming to the overlay device 428.

Regardless of the source of particular video/audio, the overlay device 428 may output video and/or audio that has been modified or augmented, etc., to include home automation information and then output to the display device 430. As such, regardless of the source of video/audio, the overlay device 428 may modify the audio/video to include home automation information and, possibly, solicit user input. For instance, in some examples the overlay device 428 may have four video inputs (e.g., four HDMI inputs) and a single video output (e.g., an HDMI output). In other examples, the receiver 240 may exhibit such features or functionality. As such, a separate device, such as a Blu-ray player may be connected with a video input of the receiver 240, thus allowing the receiver 240 to overlay home automation information when content from the Blu-Ray player is being output to the display device 430.

Regardless of whether the receiver 240 is itself configured to provide home automation functionality and output home automation input for display via the display device 430 or such home automation functionality is provided via the overlay device 428, home automation information may be presented by the display device 430 while television programming is also being presented by display device 430. For instance, home automation information may be overlaid or may replace a portion of television programming, such as broadcast content, stored content, on-demand content, etc., presented via the display device 430. For example, while television programming is being presented, the display may be augmented with information related to home automation. In general, the television programming may represent broadcast programming, recorded content, on-demand content, or some other form of content. As discussed below in various embodiments, the television programming may include one or more physical conditioning video resources requested, ordered by, or recommended for a user, and the programming displayed may be augmented by various data from the user video output engine 145 based on user and location monitoring data.

An example of information related to home automation may include a security camera feed, as acquired by a camera at a front door of a residence. Such augmentation of the television programming may be performed directly by the receiver 240 (which may or may not be in communication with the communication device 424), the overlay device 428, or a combination thereof. Such augmentation may result in solid or opaque or partially transparent graphics being overlaid onto television programming (or other forms of video) output by the receiver 240 and displayed by the display device 430. Furthermore, the overlay device 428 and/or the receiver 240 may add or modify sound to television programming also or alternatively. For instance, in response to a doorbell ring, a sound may be played through the television (or connected audio system). In addition or in alternate, a graphic may be displayed. In other examples, other particular camera data (e.g., nanny camera data) and/or associated sound or motion sensors may be integrated in the system and overlaid or otherwise made available to a user. For example, detection of a crying baby from a nanny camera may trigger an on-screen alert to a user watching television.

Returning to FIG. 4 alone, the receiver 240 and/or the overlay device 428, depending on implementation-specific details, may communicate with one or more wireless devices, such as the third party device 420. The third party devices 420 may correspond to one or more user devices 160 discussed above, and represent a tablet computer, cellular phone, laptop computer, remote computer, or some other device through which a user may desire to control home automation (device) settings and view home automation information in accordance with the principles of the present disclosure. Such a device also need not necessarily be wireless, such as in a traditional desktop computer embodiment. It is contemplated that the receiver 240, communication device 424, and/or the overlay device 428 may communicate directly with the third party device 420, or may use a local wireless network, such as network 224 for instance. The third party device 420 may be remotely located and not connected with a same local wireless network as one or more of the other devices or elements of FIG. 4.

Various home automation devices may be in communication with an event notification module of the receiver 240 and/or the overlay device 428, depending on implementation-specific details. Such home automation devices may use similar or dissimilar communication protocols. Such home automation devices may communicate with the receiver 240 directly or via the communication device 424. Such home automation devices may be controlled by a user and/or have a status viewed by a user via the display device 430 and/or third party device 420. Examples of such home automation devices are described in the following sections. It should be understood that these examples are illustrative only and not limiting, and that other types of home automation devices may be used in other examples.

One or more cameras, such as the security camera 408. It is contemplated that the security camera 408 may be installed indoors, outdoors, and may provide a video and/or an audio stream that may be presented via the third party device 420 and/or display device 430. Video and/or audio from the security camera 408 may be recorded by the overlay device 428 and/or the receiver 240 continuously, in a loop as per a predefined time period, upon an event occurring, such as motion being detected by the security camera 408, and etc. For example, video and/or audio from security camera 408 may be continuously recorded such as in the form of a rolling window, thus allowing a period of time of video/audio to be reviewed by a user from before a triggering event and after the triggering event. Video/audio may be recorded on a persistent storage device local to overlay device 428 and/or the receiver 240, and/or may be recorded and stored on an external storage devices, such as a network attached storage device or back-end server memory. In some examples, video may be transmitted across a local and/or wide area network to other one or more other storage devices upon occurrence of a trigger event, for later playback. For initial setup for example, a still may be captured by the security camera 408 and stored by the receiver 240 for subsequent presentation as part of a user interface via the display device 430. In this way, an end-user can determine which camera, if multiple cameras are present or enabled, is being set up and/or later accessed. For example, a user interface may display a still image from a front door camera, which may be easily recognized by the user because it shows a scene near or adjacent a front door of a residence, to allow a user to select the front door camera for viewing as desired.

Furthermore, video and, possibly, audio from the security camera 408 may be available live for viewing by a user via the overlay device 428 or the receiver 240. Such video may be presented simultaneously with television programming being presented. In some examples, video may only be presented if motion is detected by the security camera 408, otherwise video from the security camera 408 may not be presented by a particular display device presenting television programming. Also, such video (and, possibly, audio) from the security camera 408 may be recorded by the receiver 240 and/or the overlay device 428. In some examples, such video may be recorded based upon a user-configurable timer. For instance, features or functionality associated with the security camera 408 may be incorporated into an EPG that is output by the receiver 240 for display by a presentation or display device.

For instance, data as captured by the security camera 408 may be presented or may otherwise be accessible as a "channel" as part of the EPG along with other typical or conventional television programming channels. Accordingly, a user may be permitted to select that channel associated with the security camera 408 to access data as captured by the security camera 408 for presentation via the display device 430 and/or the third party device 420, etc. The user may also be permitted to set a timer to activate the security camera 408 to record video and/or audio for a user-defined period of time on a user-defined date. Such recording may not be constrained by the rolling window mentioned above associated with a triggering event being detected. Such an implementation may be beneficial, for example, if a babysitter is going to be watching a child and the parents want to later review the babysitter's behavior in their absence. In some examples, video/audio acquired by the security camera 408 may be backed up to a remote storage device, such as cloud-based storage hosted by an external server. Other data may also be cached to the cloud, such as configuration settings. Thus, if one or both of the receiver 240 and overlay device 428 malfunction, then a new device may be installed and the configuration data loaded onto the device from the cloud.

Further, one or more window sensors and door sensors, such as the window sensor 410 and the door sensor 412 may be integrated in to or as part of the HAS 400, and each may transmit data to the receiver 240, possibly via the communication device 424, or the overlay device 428, that indicates the status of a window or door, respectively. Such status may indicate open window or door, an ajar window or door, a closed window or door, and etc. When a status change occurs, an end-user may be notified as such via the third party device 420 and/or the display device 430, within an EPG or like interface for example. Further, a user may be able to view a status screen within an EPG or other interface to view the status one or more window sensors and/or one or more door sensors throughout the location. In some examples, the window sensor 410 and/or the door sensor 412 may have integrated "break" sensors to enable a determination as to whether glass or a hinge, or other integral component, etc., has been broken or compromised. In certain embodiments, one or both of the window sensor 410 and the door sensor 412 may be controlled via interaction with particular controls as provided within or by an EPG or like interface, and information or data as acquired by one or both of the window sensor 410 and door sensor 412 may be manipulated, consolidated, etc., as desired, and also made accessible within or by an EPG or like interface, such as a pop-up window, banner, and/or other interface or display.

Further, one or more smoke and/or CO detectors, such as detector 404, may be integrated in to or as part of the HAS 400. As such, alerts as to whether a fire (e.g., heat, smoke), CO, radon, etc., has been detected can be sent to the receiver 240, third party device 420, etc., and/or one or more emergency first responders. Accordingly, when an alert occurs, a user may be notified as such the via third party device 420 or the display device 430, within an EPG or like interface for example. Further, it is contemplated that such an interface may be utilized to disable false alarms, and that one or more sensors dispersed throughout a residence and/or integrated within the HAS 400 to detect gas leaks, radon, or various other dangerous situations. In various embodiments, a detector 404 may be controlled via interaction with particular controls as provided within or by an EPG or like interface, and information or data as acquired by the detector 404 may be manipulated, consolidated, etc., as desired, and also made accessible within or by an EPG or other interface.

Further, a pet door and/or feeder, such as pet door and/or feeder 402 may be integrated in to or as part of the HAS 400. For instance, a predefined amount of food may be dispensed at predefined times to a pet. A pet door may be locked and/or unlocked. The pet's weight or presence may trigger the locking or unlocking of the pet door. For instance, a camera located at the pet door may be used to perform image recognition of the pet or a weight sensor near the door may identify the presence of the pet and unlock the door. A user may also lock/unlock a pet door and/or dispense food for example from a "remote" location. In various embodiments, a pet door and/or feeder 402 may be controlled via interaction with particular controls as provided within or by an EPG or other interface, and data received from the pet door and/or feeder 402 may be consolidated, summarized, etc., and made accessible within or by an EPG or other interface.

Further, one or more weather sensors, such as the weather sensor 414 may be integrated in to or as part of the HAS 400, and may allow or enable the receiver 240 and/or overlay device 428 to receive, identify, and/or output various forms of environmental data, including local or non-local ambient temperature, humidity, wind speed, barometric pressure, etc. In various embodiments, weather sensors 414 may be controlled via interaction with particular controls as provided within or by an EPG or other interface, and information or data received from weather sensors 414 may be manipulated, consolidated, etc., as desired, and also made accessible within or by an EPG or other.

Further, a shade controller, such as shade controller 416, may be integrated in to or as part of the HAS 400, and may allow for control of one or more shades, such as window, door, and/or skylight shades, within a home or residence or any other location. The shade controller 416 may respond to commands received from the receiver 240 and/or overlay device 428 and may provide status updates, such as "shade up" or "shade 50% up" or "shade down" and etc. In various embodiments, shade controllers 416 may be controlled via interaction with particular controls as provided within or by an EPG or other interfaces, and data received from shade controllers 416 may be manipulated, consolidated, etc., as desired, and also made accessible within or by an EPG or other interface.

Further, one or more utility monitors, such as utility monitor 418, may be integrated in to or as part of the HAS 400, and may serve to provide the receiver 240 and/or overlay device 428 with utility data or information, such as electricity usage, gas usage, water usage, wastewater usage, irrigation usage, etc. A user may via an EPG or like interface view a status page or may receive notifications upon predefined events occurring, such as electricity usage exceeding a defined threshold within a month, or current kilowatt usage exceeding a threshold. In various embodiments, utility monitors 418 may be controlled via interaction with particular controls as provided within or by an EPG or other interface, and data received from utility monitors 418 may be manipulated, consolidated, etc., as desired, and also made accessible within or by an EPG or other interface.

Further, one or more health sensors, such as health sensor 422, may be integrated in to or as part of the HAS 400, and may permit one or more vital characteristics of a particular individual to be acquired and/or monitored, such as a heart rate for instance. In some examples, additionally or alternatively, the health sensor 422 may contain a button or other type of actuator that a user can press to request assistance. As such, the health sensor 422 may be mounted to a fixed location, such as bedside, or may be carried by a user, such as on a lanyard. Such a request may trigger a notification to be presented to other users via the display device 430 and/or the third party device 420. Additionally or if the notification is not cleared by another user within a predefined period of time, a notification may be transmitted to emergency first responders to request help. In some examples, a home automation service provider may first try contacting the user, such as via phone, to determine if an emergency is indeed occurring. Such a health sensor 422 may have additional purposes, such as for notification of another form of emergency, such as a break-in, fire, flood, theft, disaster, etc.

In some examples, health sensor 422 may be used as a medical alert pendant that can be worn or otherwise carried by an individual. It may contain a microphone and/or speaker to allow communication with other users and/or emergency first responders. The receiver 240 and/or overlay device 428 may be preprogrammed to contact a particular phone number, such as an emergency service provider, relative, medical professional, caregiver, etc., based on an actuator of the health sensor 422 being activated by a user. The user may be placed in contact with a person via the phone number and the microphone and/or speaker of the health sensor 422. Furthermore, camera data may be combined with such alerts in order to give a contacted relative more information regarding the medical situation. For example, the health sensor 422, when activated in the family room, may generate a command which is linked with security camera footage from the same room. Furthermore, in some examples, the health sensor 422 may be able to monitor vitals of a user, such as a blood pressure, temperature, heart rate, blood sugar, etc. In some examples, an event, such as a fall or exiting a structure can be detected.

Further, in response to an alert from the health sensor 422 or some other emergency or noteworthy event, parallel notifications may be sent to multiple users at approximately the same time. As such, multiple people can be made aware of the event at approximately the same time (as opposed to serial notification). Therefore, whoever the event is most pertinent to or notices the notification first can respond. Which users are notified for which type of event may be customized by a user of the receiver 240. In addition to such parallel notifications being based on data from the health sensor 422, data from other devices may trigger such parallel notifications. For instance, a mailbox open, a garage door open, an entry/exit door open during wrong time, an unauthorized control of specific lights during vacation period, a water sensor detecting a leak or flow, a temperature of room or equipment is outside of defined range, and/or motion detected at front door are examples of possible events which may trigger parallel notifications.

Additionally, a configuring user may be able to select from a list of users to notify and method of notification to enable such parallel notifications. The configuring user may prioritize which systems and people are notified, and specify that the notification may continue through the list unless acknowledged either electronically or by human interaction. For example, the user could specify that they want to be notified of any light switch operation in their home during their vacation. Notification priority could be: 1) SMS Message; 2) push notification; 3) electronic voice recorder places call to primary number; and 4) electronic voice recorder places call to spouse's number. Other examples are possible, however, it is contemplated that the second notification may never happen if the user replies to the SMS message with an acknowledgment. Or, the second notification would automatically happen if the SMS gateway cannot be contacted. In various embodiments, health sensors 422 may be controlled via interaction with particular controls as provided within or by an EPG or other interface, and data received from the health sensors 422 may be manipulated, consolidated, etc., as desired, and also made accessible within or by an EPG or other interfaces.

Further, an intercom, such as the intercom 426, may be integrated in to or as part of the HAS 400, and may permit a user in one location to communicate with a user in another location, who may be using the third party device 420, the display device 430, or some other device, such another television receiver within the structure. The intercom 426 may be integrated with the security camera 408 or may use a dedicated microphone/speaker, such as a Bluetooth® microphone. Microphones/speakers of the third party device 420, display device 430, communication device 242, overlay device 428, etc., may also or alternatively be used. A MOCA network or other appropriate type of network may be used to provide audio and/or video from the intercom 426 to the receiver 240 and/or to other television receivers and/or wireless devices in communication with the PTR 210. Here, as well as in other instances of home automation related data as acquired and served to the receiver 240 and/or overlay device 428 by particular elements of FIG. 4, the intercom 426 may be controlled via interaction with particular controls as provided within or by an EPG or like interface, and information or data as acquired by the intercom 426 may be manipulated, consolidated, etc., as desired, and also made accessible within or by an EPG or like interface in accordance with the principles of the present disclosure.

Further, one or more light controllers, such as light controller 434, may be integrated in to or as part of the HAS 400, and may permit a light to be turned on, off, and/or dimmed by the receiver 240 or the overlay device 428, such as based on a user command received from the third party device 420 or directly via receiver 240 or overlay device 428, etc. The light controller 434 may control a single light. As such, multiple different light controllers 434 may be present within a house or residence. In some examples, a physical light switch, that opens and closes a circuit of the light, may be left in the "on" position such that light controller 434 can be used to control whether the light is on or off. The light controller 434 may be integrated into a light bulb or a circuit, such as between the light fixture and the power source, to control whether the light is on or off. An end-user, via the receiver 240 or overlay device 428, may be permitted to view a status of each instance of the light controller 434 within a location.

Since the receiver 240 or overlay device 428 may communicate using different home automation protocols, different instances of the light controller 434 within a location may use disparate or different communication protocols, but may all still be controlled by the receiver 240 or overlay device 428. In some examples, wireless light switches may be used that communicate with the receiver 240 or overlay device 428. Such switches may use a different communication protocol than any particular instance of the light controller 434. Such a difference may not affect functionality because the receiver 240 or overlay device 428 may serve as a hub for multiple disparate communication protocols and perform any necessary translation and/or bridging functions. For example, a tablet computer may transmit a command over a WiFi connection and the receiver 240 or overlay device 428 may translate the command into an appropriate Zigbee® or Zwave® command for a wireless light bulb. In some examples, the translation may occur for a group of disparate or different devices. For example, a user may decide to turn off all lights in a room and select a lighting command on a tablet computer, the overlay device 428 may then identify the lights in the room and output appropriate commands to all devices over different protocols, such as a Zigbee® wireless light bulb and a Zwave® table lamp.

Additionally, it is contemplated that the PTR 210 may permit timers and/or dimmer settings to be set for lights via the light controller 434. For instance, lights can be configured to turn on/off at various times during a day according to a schedule and/or events being detected by the HAS 400, etc. Here, as well as in other instances of home automation related data as acquired and served to the receiver 240 and/or overlay device 428 by particular elements of FIG. 4, each particular instance of the light controller 434 may be controlled via interaction with particular controls as provided within or by an EPG or like interface, and information or data as acquired by each particular instance of the light controller 434 may be manipulated, consolidated, etc., as desired, and also made accessible within or by an EPG or like interface in accordance with the principles of the present disclosure.

Further, a thermostat, such as the thermostat 436, may be integrated in to or as part of the HAS 400, and may provide heating/cooling updates to the receiver 240 and/or overlay device 428 for display via display device 430 and/or third party device 420. Further, control of thermostat 436 may be effectuated via the receiver 240 or overlay device 428, and zone control within a structure using multiple thermostats may also be possible. Here, as well as in other instances of home automation related data as acquired and served to the receiver 240 and/or overlay device 428 by particular elements of FIG. 4, the thermostat 436 may be controlled via interaction with particular controls as provided within or by an EPG or like interface, and information or data as acquired by the thermostat 436 may be manipulated, consolidated, etc., as desired, and also made accessible within or by an EPG or like interface in accordance with the principles of the present disclosure.

Additional appliance sensors and/or appliance controllers 438-446 also may be integrated into or included as part of the HAS 400, in order to evaluate user readiness levels for completing physical conditioning videos and/or to determine if user's have completed criteria for physical conditioning videos. In various embodiments, appliance controllers 438-446 may permit the status of the corresponding appliances to be retrieved by the receiver 240 or overlay device 428, as well as allowing commands to be sent by the receiver 240 or overlay device 428 to control operation of the appliances. Appliance controllers 438-446 may be directly integrated as part of the corresponding appliance in some cases, or may use computer software and networks, wireless communications, and the like, to connect to the corresponding appliances. Additionally or alternatively, appliance sensors and controller 438-446 may be configured to determine appliance usage data by monitoring electricity usage of one or more associated appliance (e.g., other home automation devices or circuits within a home that are monitored), or by implementing visual or audio monitoring of the appliance (e.g., using cameras 408 and microphones with video/audio analyses to detect appliance usage).

As discussed above, both personal monitoring devices associated with users, and HAS devices and systems may collect and analyze personal user data and location data in order to determine current readiness levels for users to complete certain physical conditioning videos. In FIG. 4, appliance sensors and controllers 438-446 illustrate specific examples of appliance sensors and controllers 438-446 in a HAS 400 that may be used to collect and analyze relevant data for determining a user's readiness for completing a physical conditioning video. For example, one or more electronic scale sensors 438 may be configured to record user weight measurements and times, and to transmit that data to the receiver 240 and/or overlay device 428. As discussed below, a user's current weight may be used by a user video output engine 145 to select a particular physical conditioning video for the user or otherwise restrict/control the output of physical conditioning videos to the user. Additionally, one or more water dispenser controllers 440, refrigerator appliance controllers 442, and/or other kitchen appliance controllers 444 may be configured to determine a user's recent consumption of nourishment and nutrition, and this data may be transmit to the receiver 240 and/or overlay device 428. The user's determined hydration, nourishment, and nutritional consumption data from these appliance controllers 440-444 also may be used by the user video output engine 145 to control the output of physical conditioning videos to the user. Similarly, one or more electronic medication dispenser 446 may collect and analyze data relating to the user's use of medications and may transmit this data to the receiver 240 and/or overlay device 428. Electronic medication dispensers 446 may include external appliances such as an electronic pill dispensers, insertable or embedded medical devices such as computerized intravenous (IV) drip devices, and/or other automated medication dispensing devices. As discussed below, the user's determined medication usage data also may be used by the user video output engine 145 to control the output of physical conditioning videos to the user.

Further, one or more home security systems, such as the home security system 406, may be integrated in to or as part of the HAS 400. In general, the home security system 406 may detect motion, when a user has armed/disarmed the home security system 406, when windows/doors are opened or broken, etc. The receiver 240 may adjust settings of the home automation devices of FIG. 4 based on home security system 406 being armed or disarmed. For example, a virtual control and alarm panel may be presented to a user via the display device 430. The functions of a wall mounted panel alarm can be integrated in the graphical user interface of the TV viewing experience such as a menu system with an underlying tree hierarchical structure. It is contemplated that the virtual control and alarm panel can appear in a full screen or PiP (Picture-in-Picture) with TV content. Alarms and event notifications may be in the form of scrolling text overlays, popups, flashing icons, etc.

Additionally, camera video and/or audio, such as from the security camera 408, can be integrated with DVR content provided by the PTR 210 with additional search, zoom, time-line capabilities. The camera's video stream can be displayed full screen, PiP with TV content, or as a tiled mosaic to display multiple camera's streams at a same time. In some examples, the display can switch between camera streams at fixed intervals. The PTR 210 may perform video scaling, adjust frame rate and transcoding on video received from the security camera 408. In addition, the receiver 240 may adaptively transcode the camera content to match an Internet connection. Here, as well as in other instances of home automation related data as acquired and served to the receiver 240 and/or overlay device 428 by particular elements of FIG. 4, the home security system 406 may be controlled via interaction with particular controls as provided within or by an EPG or like interface, and information or data as acquired by the home security system 406 may be manipulated, consolidated, etc., as desired, and also made accessible within or by an EPG or like interface in accordance with the principles of the present disclosure.

Additional forms of appliance controllers and sensors not illustrated in FIG. 4 may also be incorporated as part of the HAS 400 in various embodiments. For instance, doorbell sensors and mailbox sensors, garage door sensors, and the like, may be implemented in the HAS 400 to detect and identify visitors at the user's location. The ability to control one or more showers, baths, faucets and/or external irrigation systems from the receiver 240 and/or the third party device 420 may also be provided in some embodiments. In some examples, a vehicle "dashcam" may upload or otherwise make video/audio available to the receiver 240 when within range of a particular residence. For instance, when a vehicle has been parked within range of a local wireless network with which the receiver 240 is connected, video and/or audio may be transmitted from the dashcam to the receiver 240 for storage and/or uploading to a remote server. Such systems or sensors or devices may be controlled via interaction with particular controls as provided within or by an EPG or like interface, and information or data as acquired by such systems or sensors or devices may be manipulated, consolidated, etc., as desired, and also made accessible within or by an EPG or like interface in certain embodiments.

Figure 5:
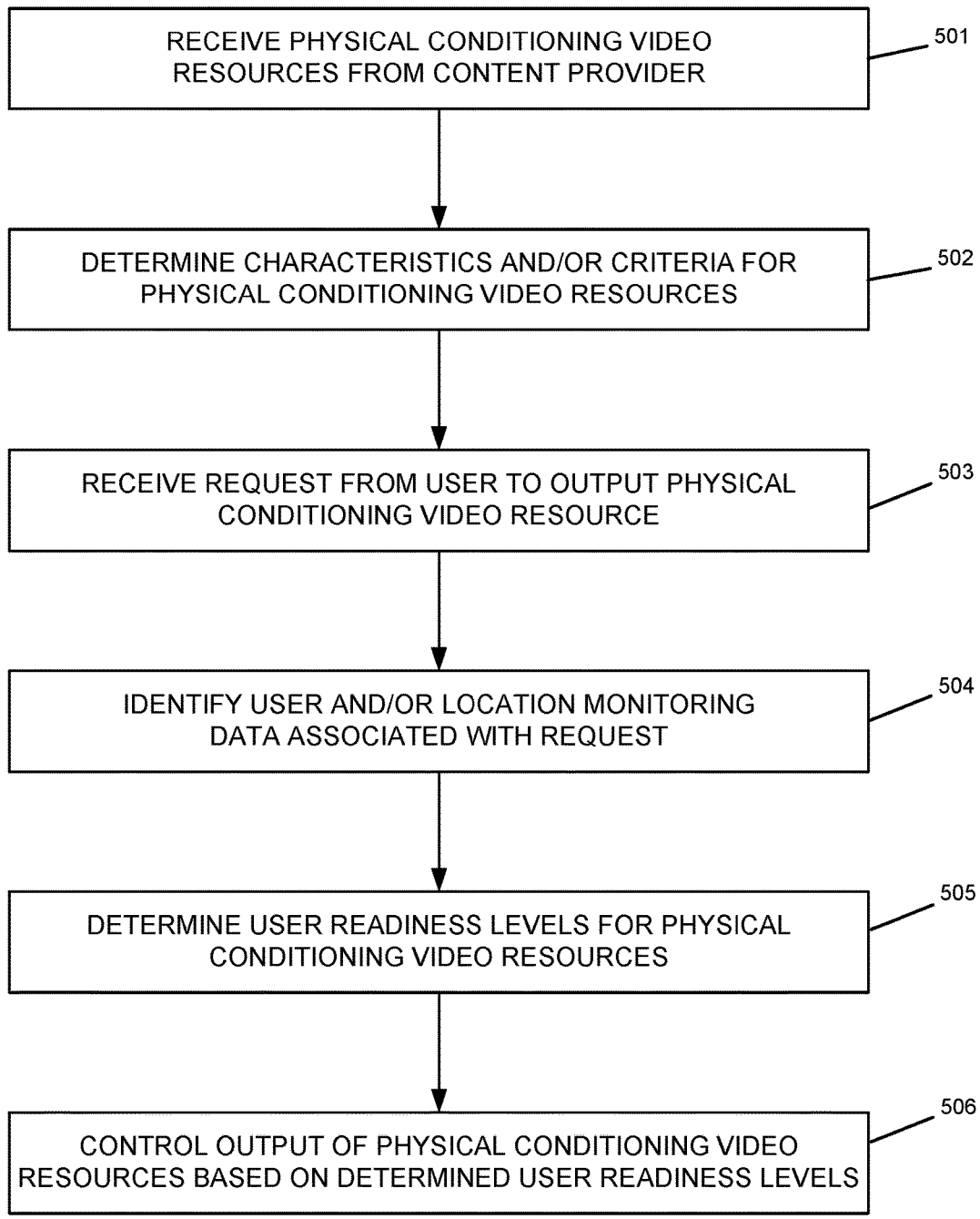
FIG. 5 is a flow diagram illustrating an example process of providing and controlling the output of specific video resources based on user and location monitoring data, in accordance with one or more embodiments of the disclosure.

Referring now to FIG. 5, a flow diagram is shown illustrating an example process of providing and controlling the output of specific video resources based on user and location monitoring data. As described below, the steps in this process may be performed by one or more components in the video delivery and output system 100 and/or the other related systems and components described above. For example, in some embodiments, steps 501-506 may correspond to the functionality performed by television receiver 140 (e.g., 240), operating autonomously or in communication with television and video content providers 110-130, user devices 160, and/or personal and home monitoring systems 180-190, etc. In other embodiments, various other devices or combinations of devices in FIGS. 1-4 may be used to perform the steps described below (e.g., back-end server-based implementations, user device-based implementations, home automation system-based implementations, etc.). For instance, some or all of the steps in this example may be performed by a user device 160, which may function as both a video receiver 240 and a presentation device 150. Such embodiments may be useful, for example, to allow a user to view and interact with physical conditioning videos while the user is away from home. Additionally, it should be understood that the techniques described herein for providing and controlling the output of video resources based on monitoring data need not be limited to the specific systems and hardware implementations described above in FIGS. 1-4, but may be performed within other computing environments comprising other combinations of hardware and software components.

In step 501, a receiver device (e.g., 240) may receive physical conditioning video resources from one or more content providers 110-130. Physical conditioning video resources may include, for example, workout and/or exercise videos (e.g., cardiovascular training, strength training, yoga or Pilates classes, etc.), videos for assisting with physical therapy or rehabilitation following an injury, low-impact exercise videos for senior citizens, videos for improving flexibility and balance, video dance classes, martial arts training classes, and instructional videos for improving form or technique for physical activities (e.g., proper lifting techniques, proper stretching techniques, proper dance techniques, proper tai chi techniques, and so on). Such videos may be received in step 501 from any or all video content providers 110-130 discussed above. For example, various physical conditioning videos may be received from one or more satellite and/or cable television service providers 110-120 and/or various Internet-based video content providers 130. Such videos may be received as part of an on-demand television service, via a pay-per-view (PPV) service, via television/video streaming services, as downloadable files via IP network 115, etc.

In some cases, a single physical conditioning video may be received in step 501, while in other cases a group of videos may be transmitted to and stored on the receiver 240 as a larger content block. In some examples, videos may be received in step 501 in response to user requests made via the receiver 240 (e.g., video streaming requests, on-demand requests, PPV purchases, etc.). As described below, such requests from the receiver 240 for specific video resources also need not be initiated by the user, but instead such requests may be determined and transmitted automatically by a user video output engine 145 and/or other system components, based on user monitoring data, previous user behaviors, etc. Alternative or additionally, specific video resources may be pushed from content providers 110-130 to receivers 240 in some embodiments, without any request from the user or receiver 240. For instance, content providers 110-130 may push specific video resources based on the user's request history, anticipated user requests, suggested or advertising content from content authors, etc. Additionally, as discussed below, one or more content providers 110-130 may be associated with medical services providers configured to receive and analyze specific user data, determine specific physical conditioning videos that are appropriate for the specific user, and then transmit the user-specific physical conditioning videos to the user's receiver 240 at appropriate times.

In step 502, the receiver 240 may determine various characteristics of the physical conditioning videos received in step 501, and/or various user criteria that may be applied to the presentation of the videos. The characteristics of a physical conditioning video that may be received or determined in step 502 may include, for example, the type of exercise or other physical activity of the video, the intensity level or skill level of the video, the particular muscle groups and/or other body parts impacted by the video content, the recommended skills/levels needed for users to complete the video, any prerequisite videos that should be completed by users before completing this video, etc. A number of techniques may be used, individually or in combination, to determine the characteristics of videos in step 502. Such techniques may include metadata extraction, audio/visual analysis of the video, and/or data metrics (e.g., biostatistics and other user feedback) from other users that have previously completed the video. These techniques and other techniques for determining user criteria based on the video characteristics are discussed further below in reference to FIG. 8.

The criteria determined in step 502 may include both general and user-specific recommendations and/or requirements that should be satisfied before a user completes a specific physical conditioning video. For example, depending on the video characteristics (e.g., the video type, intensity level, skill level, muscles/areas targeted, etc.), and the information known about the specific user(s) associated with the receiver 240, the receiver 240 may determine one or more recommendations or requirements for the specific users. User-specific recommendations or requirements may relate to the user's current physical status (e.g., user biostatistics-based criteria, diet-related criteria, sleep-related criteria, and criteria relating to the user's recent exercise sessions, etc.), the user's current medical conditions (e.g., criteria to take prescribed medication, weight criteria, hydration criteria, blood chemistry criteria, criteria to receive permission from a medical professional, etc.), and the user's history of exercise and physical conditioning (e.g., criteria to complete previous videos, criteria to obtain certain skill sets, etc.). Further examples of such criteria and the applications of user-specific criteria are discussed further below in reference to step 506 and FIGS. 6-8.

In step 503, the receiver 240 may receive a request from a user (e.g., via remote control 170 or user device 160) to play a physical conditioning video on a presentation device 150. As shown in this example, the user request to play a physical conditioning video may be received after one or more physical conditioning videos are received and stored on the receiver device 240 in step 501. For instance, a number of videos may be received in step 501 as a transmission from a medical services provider, part of an exercise video subscription services, etc. However, step 503 may occur before step 501 in some embodiments, where a user request is initially received (step 503) and the video resources are retrieved (step 501) in response to the user request. In either case, the user request in step 503 may identify one or more specific physical conditioning videos requested by the user, or alternatively may be a generic request for the receiver 240 to select and provide an appropriate video based on the user's current readiness level.

In step 504, the receiver 240 may receive and/or determine monitoring data associated with a specific user, in order to evaluate that user's current readiness level for completing one or more physical conditioning videos. In some embodiments, performing step 504 by a receiver 240 may include an initial determination by the receiver 240 of which user requested the physical conditioning video in step 503. In some cases, the receiver 240 may be configured to assume that all video requests in step 503 are associated with the same user (e.g., a primary user/viewer, an account holder of the television provider, etc.) while in other cases the receiver 240 may be configured to receive and analyze monitoring data for multiple different users in order to provide different user-specific video viewing criteria for different users at the same location. When the video request in step 503 may be initiated by one of multiple different users at the receiver 240, the particular user initiating the video request may be determined via a user sign-in process executed by the receiver 240 during the user video request in step 503. Alternatively or additionally, the receiver 240 may implement automated user detection and identification techniques, such as cameras and facial recognition capabilities, microphones and voice recognition capabilities, receiver 240 integration with other home devices/appliances, receiver 240 usage and pattern analysis, etc.

The user monitoring data collected by the receiver 240 in step 504 may include data from one or more personal monitoring devices 180 associated with the user, and/or data from one or more location monitoring systems 190 associated with the user's home or other user locations. In some cases, after the receiver 240 determines the user associated with the video request in step 503, the receiver 240 may request and receive user monitoring data from the various personal monitoring devices 180 and home monitoring systems 190 associated with that user. As discussed above, personal monitoring devices 180 may detect the current health and activity data of the user with various health and activity sensors, and then may transmit the personal monitoring data to the receiver 240. Such personal monitoring data may include, for example, user heartrate and blood pressure data, user sleep data, body temperature data, user movement data, user exercise history data, and current user blood data measurements (e.g., for glucose levels, blood counts, alcohol, medication, drugs, etc.).

Home monitoring systems 190, as discussed above, may detect and analyze current home/location data via location-based sensors, device sensors, and appliance sensors, and then may transmit the personal monitoring data to the receiver 240. Such location data may correspond to the data detected by any of the devices described above in HAS 400, for example, the user's current or recent weight (e.g., received via scale device 438), the user's current or recent sleep quality (e.g., received via sleep sensors 180 or determined based on security sensor data from 406-412, etc.), the user's current user food and drink consumption data (e.g., received via food and water appliance controllers 440-444), and the user's current medication usage data (e.g., received via medication dispensing appliances 446). In addition to these examples, location data may include any other data detectable by an HAS 400 that is potentially relevant to the user's ability to safely and successfully complete a physical conditioning video, such as the current temperature at the user's location, the current lighting conditions at the user's location, the current air quality at the user's location, and any physical obstacles near the user's presentation device 150 that may obstruct the video activity or may be potential tripping/falling hazards to the user.

In certain embodiments, the receiver 240 may collect any and all of the available personal monitoring data and/or location monitoring data for the user in step 504. However, in other embodiments, the receiver 240 may be configured to request and receive only certain data in step 504, depending on which physical conditioning video is selected and/or depending on which user the video is selected for (or by). For example, for a first user of the receiver 240, who may be healthy and fit, the receiver 240 might not apply any criteria restricting the user's access to any physical conditioning videos, and thus might not collect any user monitoring data in step 504. However, for a second user of the receiver 240, who may be elderly, who may be recovering from injury or illness, who may have a disability, and/or who may not have the skills/experience to complete the selected video, the receiver 240 may determine to control the user's access to certain physical conditioning videos, and thus may collect some or all of the user monitoring data discussed above in step 504 in order to apply user-specific criteria and controls to the videos. Additionally, different combinations of user monitoring data may be collected by the receiver 240 for a single user, depending on the specific video selected for the user. For example, a strenuous exercise video may require that a particular user should be properly fed and hydrated, while a quick stretching video might not. Similarly, a dance training video may require that the user have adequate floor space, proper lighting, and proper footwear, while a treadmill-based or stationary bike-based workout video might not. Some videos may require that a certain user has taken his/her blood pressure medicine within the last 24 hours, while other videos might not, and so on. Thus, in these examples and many other possible examples, the user monitoring data collected in step 504 may correspond to the user-specific criteria for the particular video(s) selected.

In step 505, the receiver 240 may determine the user's current level of readiness for interacting with the selected physical conditioning videos, and in step 506 the receiver 240 may control the user's access to certain video based on the determined readiness of the user. As discussed below in reference to FIG. 6, the determination of the user's readiness to play and interact with a physical conditioning video (step 505), and the controlling of the user's interaction with the video (step 506) are related steps that be implemented in several different ways.

For example, in some embodiments, determining a user's readiness to play and interact with a physical conditioning video may include comparing the user monitoring data received in step 504 to one or more user-specific and/or video-specific criteria. That is, if the user does not meet certain criteria relating to the user's current health status, medical treatment status, biostatistics, and/or other metrics, the user's access to a video may be denied or restricted. In other examples, determining the user's readiness to play and interact with a physical conditioning video may include generating an overall user readiness score for physical exertion, based on all available user monitoring data. In such examples, if the user's overall readiness score is sufficiently high (e.g., above a threshold value), then the user will be permitted to play and interact with the video. Additionally, as discussed below in reference to FIG. 6, controlling the output of a physical conditioning video (step 506) may include, for example, granting or denying a user access to a requested physical conditioning video, selecting a particular video for a user based on the monitoring data collected for that user, and/or restricting access to particular videos until a user has satisfied certain readiness criteria or met a certain overall user readiness score.

Figure 6:
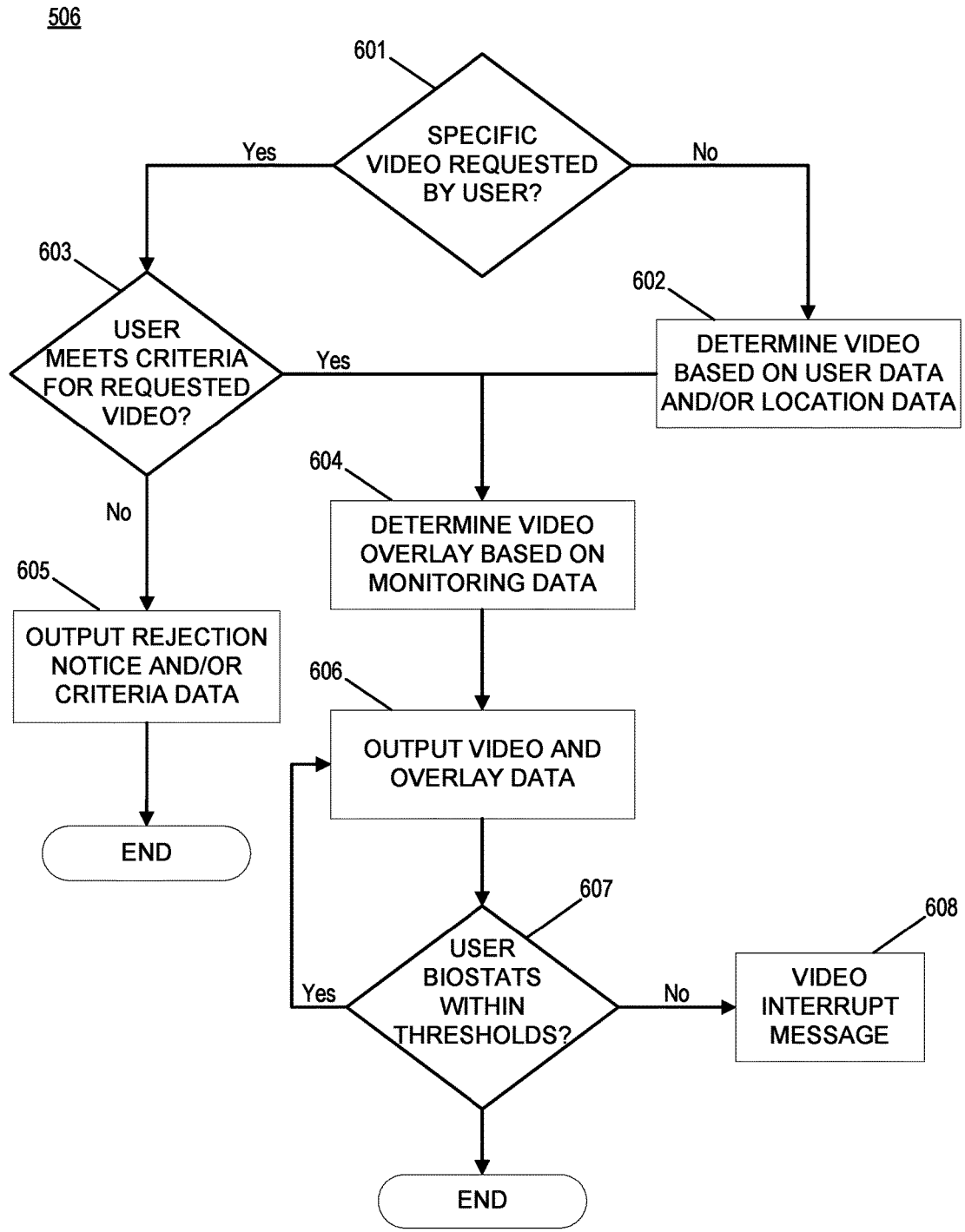
FIG. 6 is a flow diagram illustrating an example process of controlling the output of specific video resources based on user and location monitoring data, in accordance with one or more embodiments of the disclosure.

Referring now to FIG. 6, another flow diagram is shown illustrating an example process of controlling the output of specific video resources based on user and location monitoring data. As noted above, the steps in this process may correspond to step 506 in the process described in FIG. 5. Like FIG. 5, the steps described in this example may be performed by one or more components in the video delivery and output system 100 and/or the other related systems and components described above. For example, steps 601-608 may correspond to the functionality performed by television receiver 140 (e.g., 240), operating autonomously or in communication with television and video content providers 110-130, user devices 160, and/or personal and home monitoring systems 180-190, etc. In other embodiments, various other devices or combinations of devices in FIGS. 1-4 may be used to perform the steps described below (e.g., back-end server-based implementations, user device-based implementations, home automation system-based implementations, etc.). Additionally, it should be understood that the techniques described herein for controlling the output of video resources based on monitoring data need not be limited to the specific systems and hardware implementations described above in FIGS. 1-4, but may be performed within other computing environments comprising other combinations of hardware and software components.

In step 601, the receiver 240 may determine whether or not the user has requested a specific physical conditioning video. As noted above in reference to step 503, in some cases a user may identify a particular physical conditioning video to be played via presentation device 150 (601: Yes), while in other cases the user may make a generic request for a physical conditioning video to be played (e.g., a next video in an exercise program or subscription service, a video recommended by the provider, etc.) without specifying a particular video (601: No).

If the user has not selected a specific video to be played (601: No), then in step 602 the receiver 240 may determine an appropriate physical conditioning video for the user based on the data available for the user and the user monitoring data received in step 504. For example, the user may be a subscriber to an weight loss exercise video service, or may be recovering from an injury with the aid of physical therapy videos, or may be an elderly user who frequently exercises to beginning yoga and stretching videos, etc. Thus, in step 602, the receiver 240 may select a video for the user based on the user's video programs or subscriptions, the user's history of videos played and successful or unsuccessful completion of those videos, the user's typical exercise habits and times, etc.

Figure 7A:
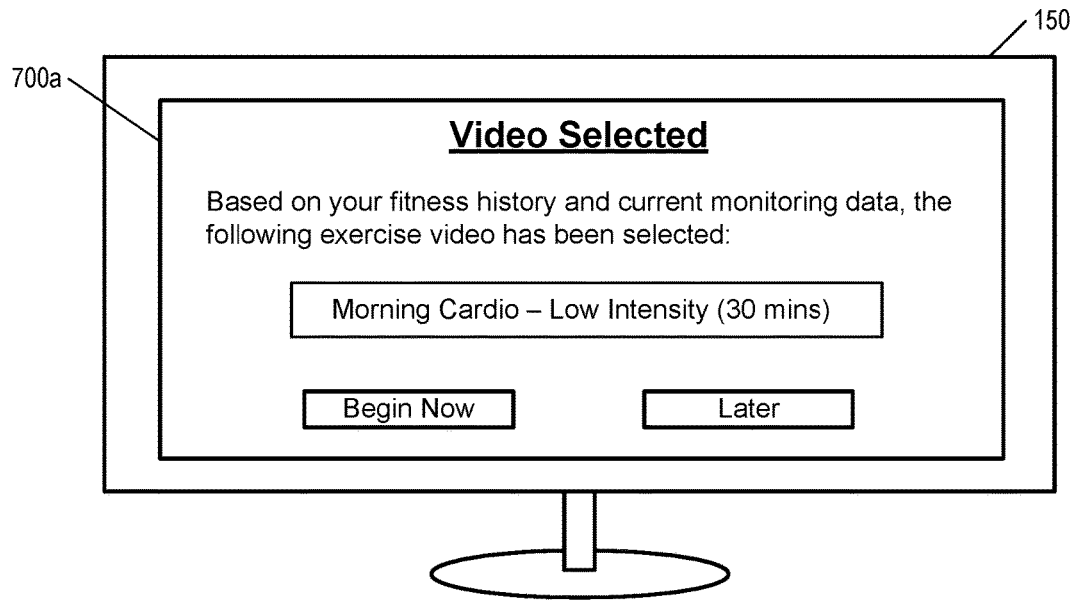
FIGS. 7A-7D are illustrative user interface screens relating to providing and controlling the output of specific video resources based on user and location monitoring data, in accordance with one or more embodiments of the disclosure.
Figure 7B:
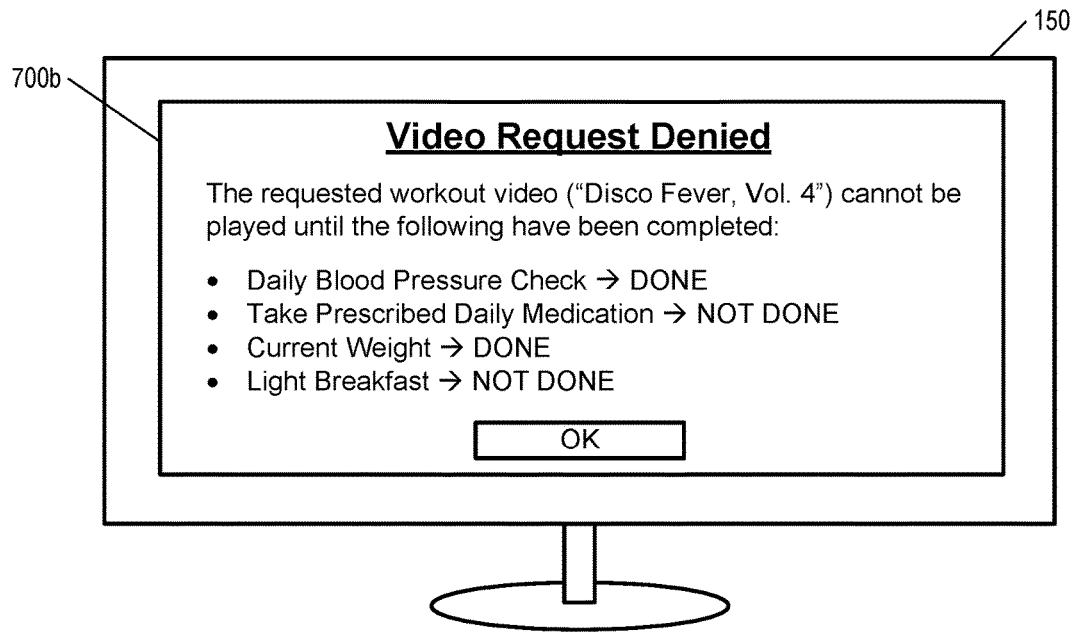
Figure 7C:
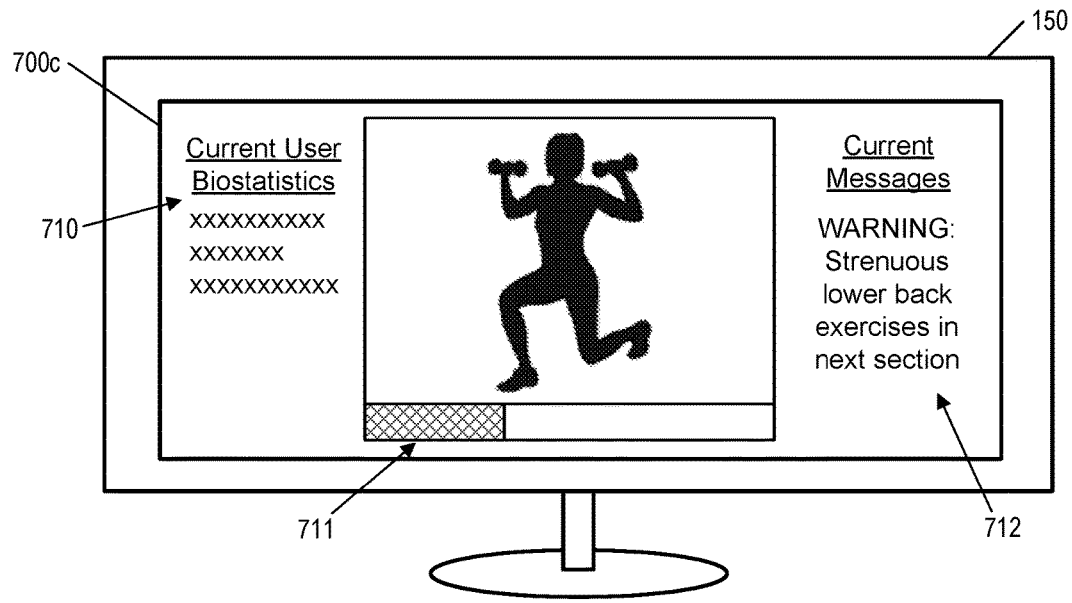

Additionally, the video selection by the receiver 240 in step 602 may be based on the user monitoring data received in step 504. For instance, based only the user's subscriptions, viewing history, and habits, the receiver 240 may initially select a particular video for the user, but that initial selection may be changed or modified based on the current user monitoring data. For example, if an initial selection for the user is the video "Cardio Weight Loss Workout, Level 13," and the monitoring data indicates a high current level of readiness for the user in step 505, then the receiver 240 may determine that the initial selection is suitable for the user at the current time. However, if the user's monitoring data indicates does not indicate a high current level of readiness in step 505, such as a lower overall user readiness score or failure of the user to meet certain criteria associated with the initial video selection, then the receiver 240 may select a different video in step 602. For instance, if the user did not sleep well last night, did not eat breakfast, or has not drank a sufficient amount of water today, then the receiver 240 may select a shorter or less intense video within the same physical conditioning series (e.g., "Cardio Weight Loss Workout, Level 5"). As another example, if the user has not taken his/her daily medication, or not received the required permission from a medical professional for the initially selected video, then the receiver 240 may select an entirely different type of video for the user (e.g., "Tai Chi for Beginners"). As yet another example, if the user had a vigorous workout the previous day or earlier in the same day, then the receiver 240 may select a recovery video (e.g., "Stretch and Cool Down") rather than another workout video. Referring briefly to FIG. 7A, an example user interface 700a is shown in which the receiver 240 has automatically select a particular exercise video for the user in step 602, based on the user's current exercise program, usage history, and the user's current level of readiness (based on user monitoring data). Of course, many other examples are possible, and it should be understood that any combination of user data and monitoring data may be used to intelligently select videos for users in step 602.

If the user has selected a specific video to be played (601: Yes), then in step 603 the receiver 240 may determine whether or not the selected video is suitable for the user, based on the user's video subscriptions or programs, the user's history, and the user's current readiness level based on the user monitoring data collected in step 504. Thus, the process of determining whether the selected video is suitable for the user is similar to the video selection change/modification process described above in step 602. For example, if the user-requested video is appropriate based on the user's history, and if the monitoring data indicates that the user's current state satisfies all of the readiness criteria for paying and interacting with the requested video, then the receiver 240 may determine that the requested video is suitable for the user at the current time (603: Yes) and may proceed to step 604.

To the contrary, if the video is not appropriate based on the user's history, or if one or more of the user-specific criteria for paying and interacting with the requested video are not currently satisfied by the user (e.g., medication-related criteria, sleep-related criteria, nutrition-related criteria, etc.), then the receiver 240 may determine that the requested video is not suitable for the user at the current time (603: No). For instance, if the user's current biostatistics (e.g., blood pressure, heart rate, blood counts, etc.) measured by the user's personal monitor device 180, or other recent user health/readiness data measured by the home automation system 190 do not satisfy one or more user-specific criteria for the requested video, then the receiver 240 may deny the user's request and display an appropriate explanation via the presentation device 150 in step 605. For example, referring briefly to FIG. 7B, an example user interface 700b is shown in which the receiver 240 has determined (step 603: No) that the user does not current meet two of the four user-specific criteria for playing the requested video, and has output the rejection notice and criteria data for the user in step 605. Thus, in this example, if the user still would like to play the requested video, the user may review the notice and satisfy the unmet criteria (e.g., by taking his/her prescribed medication and eating a light breakfasts), and then re-request the same video.

In step 604, after determining that the user-requested video (step 603) or the receiver-selected video (step 602) is suitable for the user to play and interact with, the receiver 240 may determine a user-specific video overlay based on the user's monitoring data, and in step 606 the video and overlay data may be output by the receiver 240 via the presentation device 150. The determination of a video overlay in step 604 is optional, and in some embodiments the physical conditioning video may be played directly in step 606 without an overlay. However, in other examples, a user-specific graphical overlay may be determined for the video based on the current user monitoring data and/or any other available user data or video data. For example, graphical overlays may provide video information and metadata, user-specific warnings and training tips, current user biostatistics, and other user messages. Referring briefly to FIG.

7C, an example user interface 700c is shown in which the receiver 240 is displaying a physical conditioning video to the user in step 606. In this example, the interface 700c includes a graphical overlay with current user biostatistical data 710, a video progress bar 711, and user-specific warning message box 712.

As shown in this example, user-specific warnings and/or training tips may be based on the user's medical data (e.g., current injuries, medical conditions, etc.), the user's profile/demographic data (e.g., age, gender, height, weight, etc.), the user's history of interactions with videos via the system 100 (e.g., the user's video subscription, usage amounts and habits, and/or previous videos successfully or unsuccessfully completed by the user, etc.). For instance, a previous back injury known to the receiver 240 (e.g., received from a medical provider server 130 along with a set of physical therapy and back-strengthening videos), may cause to the receiver 240 to display the warning message box 712 at appropriate times during the video. User-specific warnings and/or training tips also may be based on the user's current biostatistics data (e.g., 710), which may be displayed when the user wears a personal monitoring device 180 while playing the physical conditioning video. For example, user-specific warnings and/or training tips may remind the usage of proper breathing techniques in response to breathing data received from a respiratory monitor, may warn the user in response the detection of high or low blood pressure, glucose levels, or other chemical imbalances during the user's exercise session.

Figure 7D:
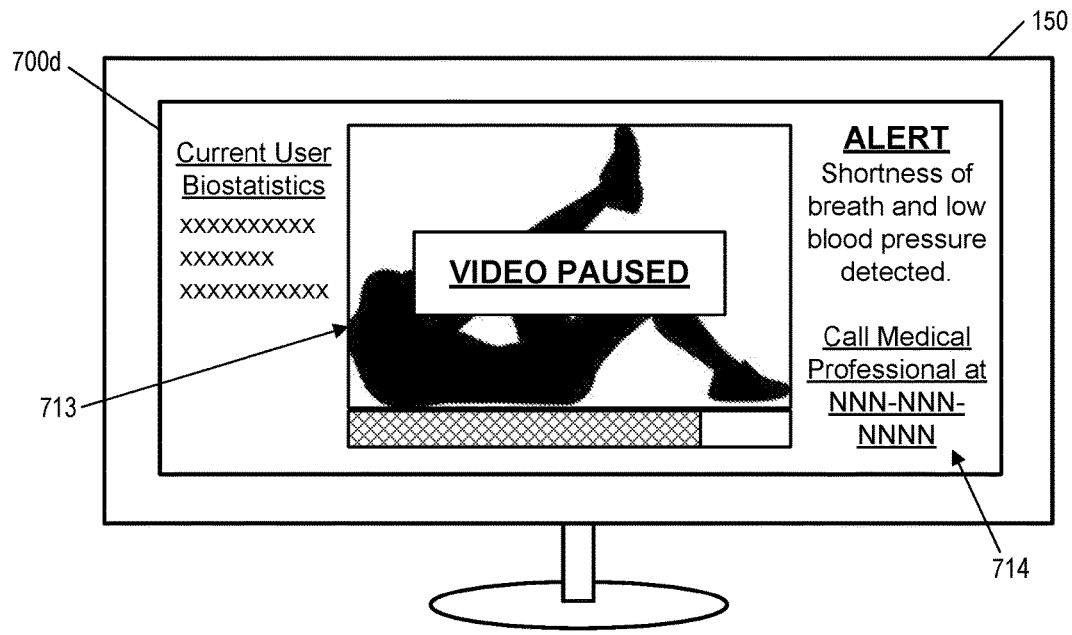

In step 607, the receiver 240 may monitor the user's biostatistics during the exercise session, and may periodically or continuously compare the user's biostatistics data to one or more user-specific thresholds to determine whether the exercise session should be interrupted. Such thresholds may be established based on the user's medical data, profile data, user history data, etc., for heartrate, respiration, blood pressure, blood counts, and/or any other biostatistics data measurable in real-time (or near real-time) with a personal monitoring device 180. If the receiver 240 determines that the user's biostatistics data exceed one or more of the user-specific thresholds during the exercise session (607: No), then the receiver 240 may automatically interrupt the exercise session and provide notification to the user in step 608. Referring briefly to FIG. 7D, an example user interface 700d is shown in which the receiver 240 has determined that a physical conditioning video should be interrupted based on the user's biostatistics data during the exercise session. In this example, the receiver 240 has determined, based on data from the user's personal monitor device(s) 180, that the user is experiencing shortness of breath and a drop in blood pressure. In this example, the interface 700d includes the video interrupt message 713 and the user medical alert 714 with instructions for the user to contact a medical professional.

Although the video interrupts described in the above examples are based on user biostatistics data, the receiver 240 may be configured to interrupt the output of videos in response to other conditions as well. Such video interrupt conditions may apply generally to all videos played via the receiver 240, or only to specific videos and/or specific users. For example, the receiver 240 may interrupt the output of a physical conditioning video to a user based on a determination the user is due to take his/her medication, or that the user should take a water break. These example video interrupt conditions may be user-specific and determined based on the user's medical data, profile data, user history data, and/or user biostatistics data, etc. As another example, the receiver 240 may interrupt the output of a video to the user in response to a signal from one or more of the HAS 400 sensors indicating a potential hazard (e.g., smoke/CO detector 404), a visitor (e.g., door sensor 412), or a potential intruder (e.g., window sensor 410, security camera 408, etc.). In contrast to the previous examples, these video interrupt conditions need not be user-specific or video-specific, but may apply to any video output to any user by the receiver 240.

Figure 8:
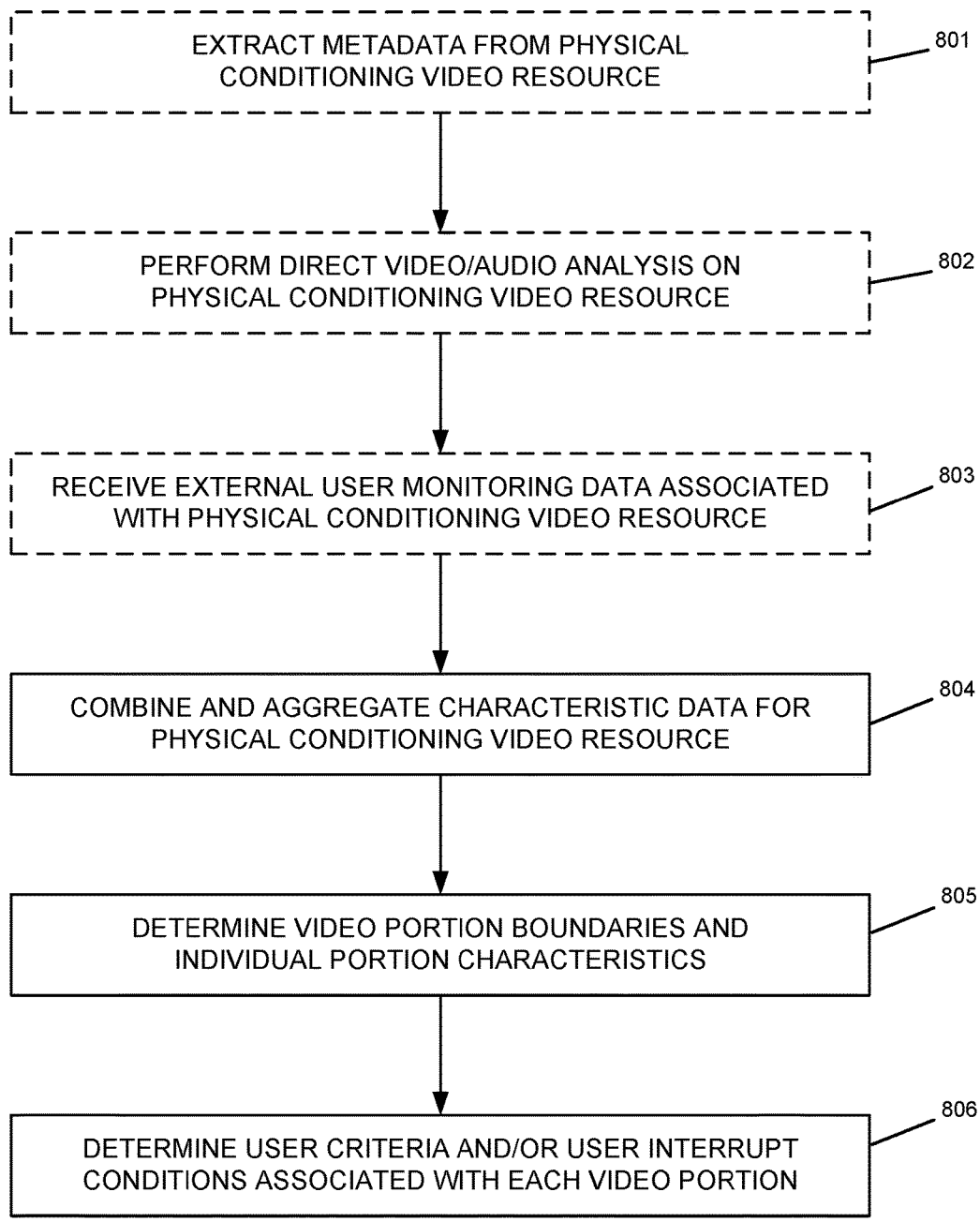
FIG. 8 is a flow diagram illustrating an example process of determining user criteria for outputting specific video portions based on the video portion characteristics, and based on user and location monitoring data, in accordance with one or more embodiments of the disclosure.

Referring now to FIG. 8, another flow diagram is shown illustrating an example process of determining video portions and characteristics of those portions, as well as determining user criteria for outputting specific video portions based on the video portion characteristics and based on the user and location monitoring data. In some embodiments, steps 801-806 in this example may be performed within step 502 in the process described in FIG. 5. Like FIG. 5, the steps described in this example may be performed by one or more components in the video delivery and output system 100 and/or the other related systems and components described above. For example, steps 801-808 may correspond to the functionality performed by receiver 240, operating autonomously or in communication with television and video content providers 110-130, user devices 160, and/or personal and home monitoring systems 180-190, etc. In other embodiments, various other devices or combinations of devices in FIGS. 1-4 may be used to perform the steps described below (e.g., back-end server-based implementations, user device-based implementations, home automation system-based implementations, etc.). For example, as noted above, some or all of the steps in this example may be performed by a user device 160, which may function as both a video receiver 240 and a presentation device 150. Such embodiments may allow the user to perform exercise sessions using physical conditioning videos, including enforcing user-specific criteria and real-time alerts based on personal monitoring data, even when the user is away from home. Additionally, it should be understood that the techniques described herein for controlling the output of video resources based on monitoring data need not be limited to the specific systems and hardware implementations described above in FIGS. 1-4, but may be performed within other computing environments comprising other combinations of hardware and software components.

The example process in FIG. 8 relates to determining multiple distinct video portions within a physical conditioning video, and determining the characteristics of each separate portion. For instance, a single physical conditioning video may have different parts or sections, which may include different types of physical exercises, different intensity levels, different skill levels, and/or which may target different muscle groups or body parts of the user. As described above (e.g., in steps 602-603), the receiver 240 may implement user-specific criteria to determine whether or not a particular physical conditioning video may be played for a particular user. Additionally, as described above (e.g., in steps 607-608), a user's exercise session may be monitored and the receiver 240 may implement user-specific conditions for determining whether or not to interrupt a physical conditioning video. Thus, the example process in FIG. 8 may be used to allow the receiver 240 to implement user-specific criteria and/or user-specific interrupt conditions for individual portions within a video. For instance, the user's current readiness level (e.g., as determined in step 505) may be sufficient to permit the user to complete some portions of a selected video, but not other portions. In such cases, the receiver 240 may automatically skip over any portions that the user is not permitted to complete, or may display a warning message advising the user to rest during these portions, etc.

Steps 801-805 relate to determining the boundaries of different portion within a physical exercise video, and identifying the relevant characteristics of each video portion. Steps 801-803, each of which is optional in this example, represent three different techniques and three possible sources of data from which the portion boundaries within a physical conditioning video may be determined. In step 801, the receiver 240 may extract metadata from a physical conditioning video received from a provider 110-130. The metadata may indicate the different parts or sections of the video, intensity levels, skill levels, muscle groups targeted, etc. In embodiments where step 801 is performed, the receiver 240 may directly extract the metadata from the video resource, or may request and receive the metadata separately from the video itself.

In step 802, the receiver 240 may initiate a video and/or audio analysis of the physical conditioning video, in order to determine the different exercises and activities performed, the different intensity levels, the different muscle groups targeted, and the like, at different times in the video. In embodiments where step 802 is performed, the receiver 240 may directly perform the analysis using internal image/video/audio analysis tools, or may transmit the video to a separate video analyzer within the system 100.

In step 803, the receiver 240 may receive user monitoring data from one or more external data sources which includes personal user monitoring data collected from other users while using the same physical conditioning video. For example, a network of receivers 240 associated with a video provider 110-130 may be configured to transmit the user monitoring data collected by personal monitoring devices 180 to a back-end server (e.g., 111, 121, or 130) via an IP network 115. The back-end server may then aggregate the monitoring data collected for many different users interacting with the same video, to determine various characteristics of the video (e.g., different intensity levels, different activities/skills performed, different muscle groups targeted, etc.) at different times in the video. In embodiments where step 803 is performed, the receiver 240 may request the aggregated data from the back-end server and/or from other receiver devices 240 in the network.

In step 804, the data received from one or more of the optional steps 801-803, relating to the characteristics at different time periods during the physical conditioning video, may be aggregated by the receiver 240. In step 805, the aggregated data may be analyzed to determine the boundaries of different portions within the physical conditioning video. As discussed above, the different video portions may correspond to different activities or exercises, different intensity levels, different muscle groups or body parts targeted, etc. Additionally, although the receiver 240 may perform the data aggregation and determination of video portion boundaries in the this example, in other cases steps 804 and 805 may be performed by a back-end server of a video provider 110-130.

In step 806, the receiver 240 may determine one or more user-specific criteria for determining whether or not the particular portions of the physical conditioning video may be played for the particular user, as well as one or more user-specific conditions for determining whether or not to interrupt a particular portion of the video during the user's exercise session. The techniques for determining user-specific criteria for playing individual video portions and user-specific interrupt conditions applicable to individual video portions may be similar or the same as the techniques discussed above in steps 602-603 (for determining user-specific criteria) and steps 607-608 (for determining and initiating user-specific interrupts). The difference, as noted above, is that the user criteria and interrupt conditions determined in step 806 may be determined for each individual portion of the video, rather than for the video as whole. Thus, the criteria and conditions determined for different portions of the video in step 806 may be used by the receiver 240 to control the output of the video in step 606, for example, by permitted the user to complete only certain portions of the video but not others based on the user's current readiness level, and/or to initiate video interrupts based on conditions applicable to certain portions of the video but not others.

Figure 9:
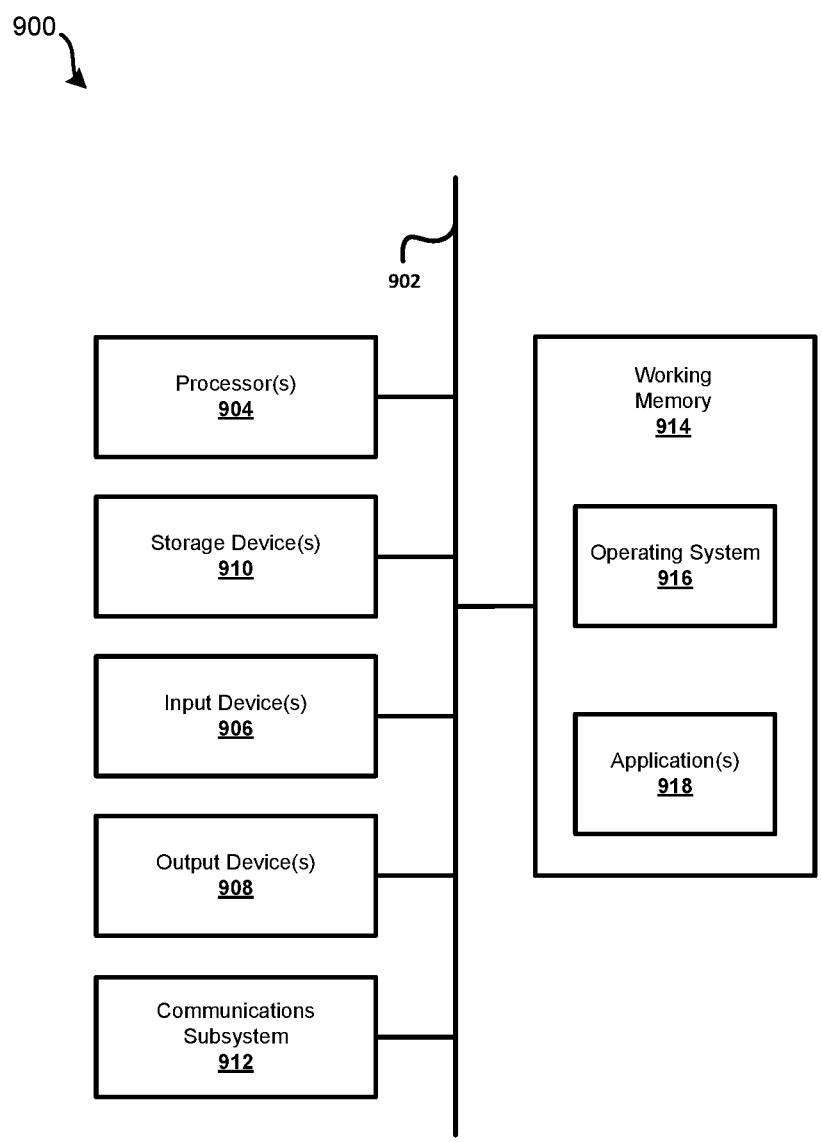
FIG. 9 is a block diagram illustrating an example computing system upon which various features of the present disclosure may be implemented.

Referring now to FIG. 9, an example is shown of a computer system or device 900 in accordance with the disclosure. Examples of computer systems or devices 900 may include systems, controllers, servers, monitors, sensors, or the like, an enterprise server, blade server, desktop computer, laptop computer, tablet computer, personal data assistant, smartphone, gaming console, set-top box, television receiver, "smart" home automation-related sensor or device or system or controller or monitor or detector, and/or any other type of machine configured for performing calculations. Any particular one of the previously-described computing devices may be wholly or at least partially configured to exhibit features similar to the computer system 900, such as any of the respective elements or components of FIGS. 1-4. In this manner, any of one or more of the respective elements of those figures may be configured and/or arranged, wholly or at least partially, for implementing collecting and analyzing user and/or location monitoring data, and for outputting video resources to users based on the monitoring data, as discussed above. Still further, any of one or more of the respective elements of FIGS. 1-4 may be configured and/or arranged to include computer-readable instructions that, when executed, instantiate and implement various functionality described herein (e.g., one or more user video output engines, devices, or services 145).

The computer device 900 is shown comprising hardware elements that may be electrically coupled via a bus 902 (or may otherwise be in communication, as appropriate). The hardware elements may include a processing unit with one or more processors 904, including without limitation one or more general-purpose processors and/or one or more special-purpose processors (such as digital signal processing chips, graphics acceleration processors, and/or the like); one or more input devices 906, which may include without limitation a remote control, a mouse, a keyboard, and/or the like; and one or more output devices 908, which may include without limitation a presentation device (e.g., television), a printer, and/or the like.

The computer system 900 may further include (and/or be in communication with) one or more non-transitory storage devices 910, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 900 might also include a communications subsystem 912, which may include without limitation a modem, a network card (wireless and/or wired), an infrared communication device, a wireless communication device and/or a chipset such as a Bluetooth™ device, 802.11 device, WiFi device, WiMax device, cellular communication facilities such as GSM (Global System for Mobile Communications), W-CDMA (Wideband Code Division Multiple Access), LTE (Long Term Evolution), etc., and/or the like. The communications subsystem 912 may permit data to be exchanged with a network (such as the network described below, to name one example), other computer systems, and/or any other devices described herein. In many examples, the computer system 900 will further comprise a working memory 914, which may include a random access memory and/or a read-only memory device, as described above.

The computer device 900 also may comprise software elements, shown as being currently located within the working memory 914, including an operating system 916, device drivers, executable libraries, and/or other code, such as one or more application programs 918, which may comprise computer programs provided by various examples, and/or may be designed to implement methods, and/or configure systems, provided by other examples, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the storage device(s) 910 described above. In some cases, the storage medium might be incorporated within a computer system, such as computer system 900. In other examples, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 900 and/or might take the form of source and/or installable code, which, upon compilation and/or installation on the computer system 900 (e.g., using any of a variety of generally available compilers, installation programs, compression/decompression utilities, etc.), then takes the form of executable code.

It will be apparent that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some examples may employ a computer system (such as the computer device 900) to perform methods in accordance with various examples of the disclosure. According to a set of examples, some or all of the procedures of such methods are performed by the computer system 900 in response to processor 904 executing one or more sequences of one or more instructions (which might be incorporated into the operating system 916 and/or other code, such as an application program 918) contained in the working memory 914. Such instructions may be read into the working memory 914 from another computer-readable medium, such as one or more of the storage device(s) 910. Merely by way of example, execution of the sequences of instructions contained in the working memory 914 may cause the processor(s) 904 to perform one or more procedures of the methods described herein.

The terms "machine-readable medium" and "computer-readable medium," as used herein, may refer to any non-transitory medium that participates in providing data that causes a machine to operate in a specific fashion. In an example implemented using the computer device 900, various computer-readable media might be involved in providing instructions/code to processor(s) 904 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 910. Volatile media may include, without limitation, dynamic memory, such as the working memory 914.

Example forms of physical and/or tangible computer-readable media may include a floppy disk, a flexible disk, hard disk, magnetic tape, or any other magnetic medium, a compact disc, any other optical medium, ROM (Read Only Memory), RAM (Random Access Memory), and etc., any other memory chip or cartridge, or any other medium from which a computer may read instructions and/or code. Various forms of computer-readable media may be involved in carrying one or more sequences of one or more instructions to the processor(s) 904 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 900.

The communications subsystem 912 (and/or components thereof) generally will receive signals, and the bus 902 then might carry the signals (and/or the data, instructions, etc. carried by the signals) to the working memory 914, from which the processor(s) 904 retrieves and executes the instructions. The instructions received by the working memory 914 may optionally be stored on a non-transitory storage device 910 either before or after execution by the processor(s) 904. It should further be understood that the components of computer device 900 can be distributed across a network. For example, some processing may be performed in one location using a first processor while other processing may be performed by another processor remote from the first processor. Other components of computer system 900 may be similarly distributed. As such, computer device 900 may be interpreted as a distributed computing system that performs processing in multiple locations. In some instances, computer system 900 may be interpreted as a single computing device, such as a distinct laptop, desktop computer, or the like, depending on the context.

The methods, systems, and devices discussed above are examples. Various configurations may omit, substitute, or add various method steps or procedures, or system components as appropriate. For instance, in alternative configurations, the methods may be performed in an order different from that described, and/or various stages or steps or modules may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example examples described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for outputting video based on user and location monitoring data, the method comprising:

receiving, by a receiver device associated with a particular location, one or more physical conditioning video resources transmitted from a content provider, each physical conditioning video resource including content representing one or more types of physical activity at one or more intensity levels of the physical activity;

receiving, by the receiver device, a selection of a physical conditioning video resource to be output to a user via a display device at the particular location;

determining, by the receiver device in accordance with the one or more types of physical activity at the one or more intensity levels of the physical activity represented in the selected physical conditioning video resource, a combination of user monitoring data collectable by the receiver device to indicate current health and activity data of the user, the combination of user monitoring data comprising first monitoring data from at least one personal monitoring device associated with the user and second monitoring data from at least one location monitoring system associated with the particular location;

receiving, by the receiver device, the combination of user monitoring data from the at least one personal monitoring device and from the at least one location monitoring system;

determining, by the receiver device, a current readiness level of the user for completing the selected physical conditioning video resource, the current readiness level determined in response to receiving the selection and in accordance with the received combination of user monitoring data, the current readiness level indicating whether the user is ready to play and interact with the selected physical conditioning video resource; and controlling access, by the receiver device, to the selected physical conditioning video resource by the user based on the determined current readiness level of the user for completing the selected physical conditioning video resource.

2. The method of claim 1, further comprising:

selecting the physical conditioning video resource for outputting to the user, from a plurality of physical conditioning video resources accessible to the receiver device, based on a respective current readiness level of the user for completing each of the plurality of physical conditioning video resources accessible to the receiver device.

3. The method of claim 1, wherein the controlling access comprises:

denying access to the different physical conditioning video resource based on the determined current readiness level of the user for completing the selected physical conditioning video resource; and outputting, by the receiver device to the display device at the particular location, data explaining the denial of access to the selected physical conditioning video resource, said data including one or more items of the combination of user monitoring data.

4. The method of claim 1, wherein the controlling access comprises outputting the selected physical conditioning video resource based on the determined current readiness level of the user, and further comprising:

overlaying at least one of audio content or graphical content during the output of the selected physical conditioning video resource, wherein the overlaid content is based on the first monitoring data.

5. The method of claim 1, wherein the first monitoring data comprises current user biostatistics data.

6. The method of claim 1, further comprising:

determining a plurality of separate video portions within the physical conditioning video resource;

analyzing each of the plurality of separate video portions, and determining one or more physical activity requirement levels for each of the plurality of separate video portions; and comparing each of the physical activity requirement levels for each of the plurality of separate video portions to the combination of user monitoring data.

7. The method of claim 6, wherein determining the plurality of separate video portions within the physical conditioning video resource comprises:

extracting a plurality of metadata describing physical activities performed at different times during the physical conditioning video resource; and dividing the physical conditioning video resource into the plurality of separate video portions based on the extracted metadata.

8. The method of claim 6, wherein determining the plurality of separate video portions within the physical conditioning video resource comprises:
  analyzing audio and visual components of the physical conditioning video resource at different times during the physical conditioning video resource; and
  dividing the physical conditioning video resource into the plurality of separate video portions based on the analysis of the audio and visual components of the physical conditioning video resource at different times.

9. The method of claim 6, wherein determining the plurality of separate video portions within the physical conditioning video resource comprises:
  receiving, by the receiver device, biostatistics data collected by personal monitoring devices associated with other users during previous time periods of playback of the physical conditioning video resource at other locations associated with the other users.

10. The method of claim 1, further comprising:
  outputting the physical conditioning video resource for the user via the display device at the particular location;
  collecting biostatistics data associated with the user from the personal monitoring device, during the output of the physical conditioning video resource via the display device;
  comparing the biostatistics data associated with the user to one or more user-specific threshold values; and
  interrupting the output of the physical conditioning video resource via the display device, based on the comparison of the biostatistics data to the user-specific threshold values.

11. The method of claim 1, wherein the selection of the physical conditioning video is received from the user.

12. The method of claim 1, wherein determining the combination of user monitoring data comprises determining one or more user-specific criteria.

13. The method of claim 1, wherein:
  receiving the combination of user monitoring data comprises:
    receiving at least some of the second monitoring data as device operation and status data from an electronic medication dispenser at the particular location; and
    determining current medication usage data of the user based on the device operation and status data received from the electronic medication dispenser; and
  determining the current readiness level of the user for completing the selected physical conditioning video resource comprises comparing the current medication usage data of the user to a medication usage criteria.

14. The method of claim 1, wherein
  receiving the combination of user monitoring data comprises:
    receiving at least some of the second monitoring data as device operation and status data from one or more kitchen appliance controllers at the particular location; and
    determining current nutritional intake of the user, based on the device operation and status data received from the one or more kitchen appliance controllers; and
  determining the current readiness level of the user for completing the selected physical conditioning video resource comprises comparing the current nutritional intake of the user to a nutritional consumption criteria.

15. The method of claim 1, wherein
  receiving the combination of user monitoring data comprises:
    receiving at least some of the second monitoring data as device operation and status data from one or more water dispenser controllers at the particular location; and
    determining a current hydration level of the user, based on the device operation and status data received from the one or more water dispenser controllers; and
  determining the current readiness level of the user for completing the selected physical conditioning video resource comprises comparing the current hydration level of the user to a user hydration criteria.

16. A system comprising:
  a processing unit comprising one or more processors; and
  a memory communicatively coupled with and readable by the one or more processors and having stored therein processor-readable instructions which, when executed by the one or more processors, cause the one or more processors to:
    receive one or more physical conditioning video resources transmitted from a content provider, each physical conditioning video resource including content representing one or more types of physical activity at one or more intensity levels of the physical activity;
    receive a selection of a physical conditioning video resource to be output to a user via a display device at a particular location;
    determine, in accordance with the one or more types of physical activity at the one or more intensity levels of the physical activity represented in the selected physical conditioning video resource, a combination of user monitoring data collectable by the receiver device to indicate current health and activity data of the user, the combination of user monitoring data comprising first monitoring data from at least one personal monitoring device associated with the user and second monitoring data from at least one location monitoring system associated with the particular location;
    receive the combination of user monitoring data from the at least one personal monitoring device and from the at least one location monitoring system;
    determine a current readiness level of the user for completing the selected physical conditioning video resource, the current readiness level determined in response to receiving the selection and in accordance with the received combination of user monitoring data, the current readiness level indicating whether the user is ready to play and interact with the selected physical conditioning video resource; and
    control access to the selected physical conditioning video resource by the user based on the determined current readiness level of the user for completing the selected physical conditioning video resource.

17. The system of claim 16, the memory having stored therein further processor-readable instructions which, when executed by the one or more processors, cause the one or more processors to:
  select the physical conditioning video resource for outputting to the user, from a plurality of available physical conditioning video resources, based on the combination of user monitoring data.

18. The system of claim 16, the memory having stored therein further processor-readable instructions which, when executed by the one or more processors, cause the one or more processors to control access by:

denying access to the selected physical conditioning video resource based on the determined current readiness level of the user for completing the selected physical conditioning video resource; and outputting, to the display device at the particular location, data explaining the denial of access to the different physical conditioning video resource selected by the user, said data including one or more items of the combination of user monitoring data.

19. A non-transitory processor-readable medium comprising processor-readable instructions configured to cause one or more processors to:

receive one or more physical conditioning video resources transmitted from a content provider, each physical conditioning video resource including content representing one or more types of physical activity at one or more intensity levels of the physical activity;

receive a selection of a first physical conditioning video resource to be output via a display device to a user at a particular location;

determine, in accordance with the one or more types of physical activity at the one or more intensity levels of the physical activity represented in the selected physical conditioning video resource, a combination of user monitoring data collectable by the receiver device to indicate current health and activity data of the user, the combination of user monitoring data comprising first monitoring data from at least one personal monitoring device associated with the user and second monitoring data from at least one location monitoring system associated with the particular location;

receive the combination of user monitoring data from the at least one personal monitoring device and from the at least one location monitoring system;

determine a current readiness level of the user for completing the selected physical conditioning video resource, the current readiness level determined in response to receiving the selection and in accordance with the received combination of user monitoring data, the current readiness level indicating whether the user is ready to play and interact with the selected physical conditioning video resource; and control access to the selected physical conditioning video resource by the user based on the determined current readiness level of the user for completing the selected physical conditioning video resource, the controlling access comprising:

outputting the selected physical conditioning video resource to the display device;

overlaying at least one of audio content or graphical content during the output of the first physical conditioning video resource, wherein the overlaid content is based on one or more of the first monitoring data and the second monitoring data;

collecting biostatistics data associated with the user from the personal monitoring device, during the output of the selected physical conditioning video resource via the display device;

comparing the biostatistics data associated with the user to one or more user-specific threshold values; and interrupting the output of the selected physical conditioning video resource via the display device based on the comparison of the biostatistics data to the user-specific threshold values.

\* \* \* \* \*